(12) United States Patent
Stout

(10) Patent No.: US 7,476,298 B2
(45) Date of Patent: Jan. 13, 2009

(54) STRUCTURE FOR MULTIPLE-EFFECT DISTILLATION USING TUBES OR PLATES

(76) Inventor: Timothy R. Stout, 2240 Lotus Rd., Placerville, CA (US) 95667

( * ) Notice: Subject to any disclaimer, the term of this patent is extended or adjusted under 35 U.S.C. 154(b) by 214 days.

(21) Appl. No.: 10/504,330

(22) PCT Filed: Feb. 27, 2003

(86) PCT No.: PCT/US03/05805

§ 371 (c)(1),
(2), (4) Date: Mar. 14, 2005

(87) PCT Pub. No.: WO03/074959

PCT Pub. Date: Sep. 12, 2003

(65) Prior Publication Data

US 2005/0150756 A1    Jul. 14, 2005

Related U.S. Application Data

(60) Provisional application No. 60/361,197, filed on Mar. 2, 2002.

(51) Int. Cl.
*B01D 1/26* (2006.01)
*B01D 3/04* (2006.01)
*B01D 1/22* (2006.01)

(52) U.S. Cl. ............... 202/174; 159/17.1; 159/27.1; 159/28.2; 159/28.6; 159/DIG. 8; 159/DIG. 42; 202/155; 202/197; 202/237

(58) Field of Classification Search ............... 202/174, 202/197, 154, 155, 237, 269; 159/17.1, 28.6, 159/43.1, 26.1, 13.2, 27.1, 28.2, DIG. 8, 159/DIG. 42

See application file for complete search history.

(56) References Cited

U.S. PATENT DOCUMENTS

| 1,790,828 | A | * | 2/1931 | McKnight ............... 165/72 |
| 3,595,786 | A | * | 7/1971 | Horvath et al. .......... 210/198.1 |
| 3,768,539 | A |   | 10/1973 | Chamberlin et al. |
| 3,941,663 | A |   | 3/1976 | Steinbruchel |
| 4,638,855 | A | * | 1/1987 | Elmore et al. ............ 165/101 |
| 4,878,535 | A |   | 11/1989 | Rosenblad |
| 5,232,557 | A |   | 8/1993 | Kontu et al. |
| 5,303,769 | A | * | 4/1994 | Hoegberg ............... 165/108 |
| 5,423,952 | A |   | 6/1995 | Stout |
| 5,810,975 | A |   | 9/1998 | Bourdel |

\* cited by examiner

*Primary Examiner*—Virginia Manoharan
(74) *Attorney, Agent, or Firm*—Jacobson Holman PLLC

(57) ABSTRACT

A structure for a multiple-effect still includes a horizontal shell encompassing a plurality of effects and a series of vertical compound baffles fastened to the horizontal shell and dividing it into a series of pressure-tight chambers. Each chamber along with its associated apparatus constitutes an effect. Each compound baffle comprises a fixed baffle and a removable baffle. A heat exchanger is fastened to the removable baffle and includes an evaporation surface, a condensation surface, and a pressure chamber isolated from the pressure-tight chamber in which it is located. A port in the compound baffle allows evaporate to pass between the pressure chamber and the pressure-tight chamber of an adjacent effect. The shell is provided with a removable top plate to provide access to the heat exchanger and allow removal of the heat exchanger and removable baffle.

5 Claims, 16 Drawing Sheets

US 7,476,298 B2

STRUCTURE FOR MULTIPLE-EFFECT DISTILLATION USING TUBES OR PLATES

CROSS-REFERENCE TO RELATED APPLICATIONS

The present patent application is a nationalization of International application No. PCT/US2003/005805, filed Sep. 27, 2003, published in English, which is based on, and claims priority from, U.S. provisional Application No. 60/361,197, filed Mar. 2, 2002, both of which are incorporated herein by reference in their entireties.

BACKGROUND OF THE INVENTION

1. Field of the Invention

This invention relates to an improved structure for multiple-effect distillation. More specifically, it relates to a modular structure for each effect, wherein a multiplicity of modules are concatenated to produce the desired number of effects. It is applicable to effects using either tubes or plates as the primary heat exchanger between effects.

2. Related Art

This is an improvement invention on my U.S. Pat. No. 5,423,759, Structure for multiple-effect distillation, which disclosed a structure for a multiple-effect still based on single vertical baffles separating adjacent effects and which used vertical heat exchanger tubes, where the tubes were mounted in a lower tube sheet which was fastened and sealed to the baffle, and where the baffle had an aperture or "window" lower than the tube sheet which allowed vapor and liquid to pass from one effect to another; additional supporting apparatus were also disclosed. The former invention also featured a shell between effects made of four pieces of channel welded together into a frame, with the baffles sandwiched between adjacent frames.

While the structure disclosed by the former invention was simple to manufacture, it proved difficult to maintain. The current invention solves this problem.

SUMMARY OF THE INVENTION

An easily removable top plate is disclosed. Additionally, a removable baffle with distillation assembly is disclosed. This makes available simple access to the internal components of the still. Furthermore, the entire baffle with distillation assembly now can be easily removed from the still for maintenance or replacement.

The new structure is compatible with heat exchangers made from plates or from tubes.

I further disclose a novel method of using plates as heat exchangers, using the new, improved structure. Use of heat exchanger plates can result in reduced manufacturing costs and a denser concentration of heat exchange surface area within a given shell volume, which in turn provides for a higher product output capacity for a given physical equipment size.

DESCRIPTION OF THE PREFERRED EMBODIMENTS

In order to aid in understanding the same reference numbers will be used in the various figures to follow when similar structures are discussed.

Figure 1:
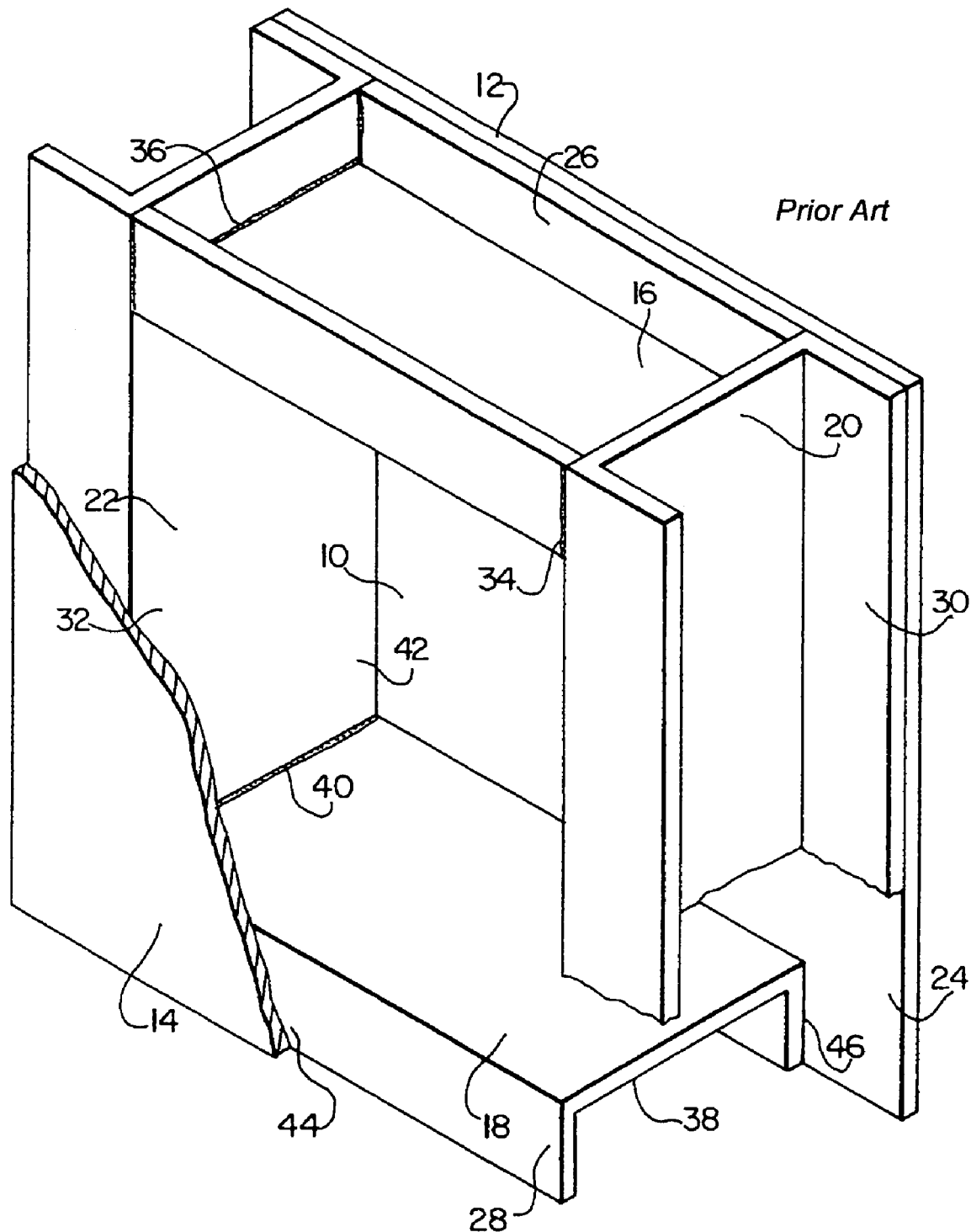
FIG. 1 is a perspective rear view of a structure for multiple-effect distillation as disclosed in U.S. Pat. No. 5,423,759.

With reference to FIG. 1, my prior invention as disclosed in my U.S. Pat. No. 5,423,759 is summarized as follows: a vapor-tight chamber 10 for an effect module 12 is enclosed by a first baffle 24, an upper wall 16, a lower wall 18, a first side wall 20, a second side wall 22, and a second baffle 24. Upper wall 16 comprises the web portion of first channel 26. Lower wall 18 comprises the web portion of second channel 28. First side wall 20 comprises that portion of the web of third channel 30 which lies at and below the junction of upper wall 16 with third channel 30 and at and above the junction of lower wall 18 with third channel 30, Second side wall 22 comprises that portion of the web of fourth channel 32 which lies at and below the junction of upper wall 16 with fourth channel 32 and at and above the junction of lower wall 18 with fourth channel 32.

A portion of third channel 30 has been cut away in the illustration to clarify the orientation of second channel 28.

Conceptually, the four pieces of channel when welded at their intersections constitute a containment box 42. First baffle 24 extends past all four of said walls 16, 18, 20, and 22 and covers the flanges of a first end 44 of box 42 in order to allow the first baffle 24 to be fastened to box 42. Second baffle 24 likewise covers the flanges of a second end 46 of box 42 in order that it too may be fastened to box 42. Containment box 42 in combination with first baffle 24 and second baffle 42 constitute vapor-tight chamber 10.

Figure 2:
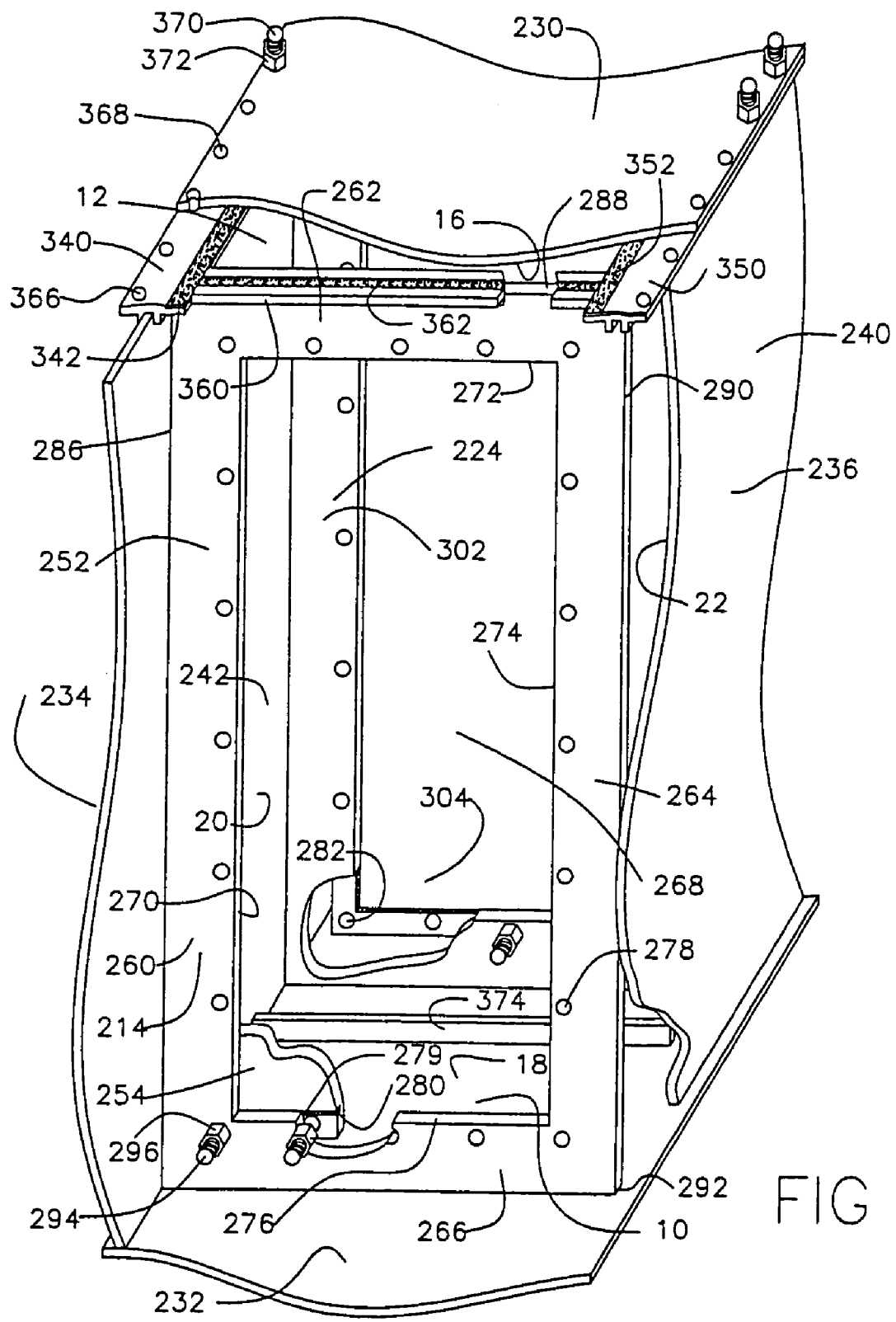
FIG. 2 is a perspective view of a first embodiment of a structure for multiple-effect distillation in accordance with the present invention.

In FIG. 2, which corresponds to FIG. 1 of the prior invention but shows the improvements of this invention, a vapor-tight chamber 10 for an effect module 12 is enclosed by a compound baffle assembly 214 shown with cutaway, an upper wall 16, a lower wall 18, a first side wall 20, a second side wall 22, and an adjacent compound baffle assembly 224 shown with cutaway. Upper wall 16 comprises a portion of the bottom surface of top plate 230. Lower wall 18 comprises a portion of the upper surface of bottom plate 232. First side wall 20 comprises a portion of the interior surface of first side plate 234. Second side wall 22 comprises a portion of the interior surface of second side plate 236. Top plate 230, bottom plate 232, first side plate 234, and second side plate 236 are all flat plates which extend in their length over a multiplicity of effects, with portions of their surfaces forming the various walls of the differing effects as described.

Shell 240 is comprised of top plate 230, bottom plate 232, first side plate 234, and second side plate 236 as extended over their complete lengths.

Box 242 is comprised of those portions of top plate 230, bottom plate 232, first side plate 234, and second side plate 236 located at and between compound baffle assembly 214 and adjacent compound baffle assembly 224.

A primary difference between the prior art and the present invention concerns the structure and mounting of the baffles. The prior art used a homogenous first baffle 24 and homogenous second baffle 24, as illustrated in FIG. 1. The present invention uses compound baffles, one component of which is permanently attached to the shell and has mounting functionality and a second of which is removable for maintenance. Thus, compound baffle 214 is comprised of mounting baffle 252 and removable baffle 254 shown with cutaway. Mounting baffle 252 in turn is comprised of mounting baffle first side segment 260, mounting baffle upper segment 262, mounting baffle second side segment 264, and mounting baffle bottom segment 266. Mounting baffle 252 features mounting baffle aperture 268 within its central area, where mounting baffle aperture 268 is bounded by the mounting baffle first side segment interior edge 270, mounting baffle upper segment interior edge 272, mounting baffle second side segment interior edge 274, and mounting baffle bottom segment interior edge 276.

Mounting baffle 252 also includes a multiplicity of mounting baffle bolting apertures 278 surrounding mounting baffle aperture 268, spaced closely enough to each other so that when they are used to fasten removable baffle 254 to mounting baffle 252, adequate joining strength and sealing functionality is provided.

Removable baffle 254 completely covers mounting baffle aperture 268 and overlaps a sufficient portion of the interior regions of mounting baffle 252 to provide a sealing surface and fastening surface.

Baffle gasket 280 is shown in cutaway and is located between and provides a seal between mounting baffle 252 and removable baffle 254. Baffle gasket 280 extends completely around and surrounds mounting baffle aperture 268. Mounting baffle bolting apertures 278 are placed within mounting baffle 252 a sufficient distance from mounting baffle aperture 268 to provide a mounting baffle sealing surface 279 on mounting baffle 252 between the mounting baffle bolting apertures 278 and mounting baffle aperture 268. Baffle gasket 280 presses against mounting baffle sealing surface 279 for sealing.

Removable baffle 254 is provided with a multiplicity of removable baffle bolting apertures 282 which correspond in number, size, and location to the mounting baffle bolting apertures 278 of mounting baffle 252. Thus, when removable baffle 254 is properly aligned with mounting baffle 252, the two may be sealingly fastened together by placing bolts 294 through mounting baffle bolting apertures 278 and removable baffle bolting apertures 282 and then installing and tightening nuts 296 onto bolts 294. Likewise, during maintenance operations, removing bolts 294 and nuts 296 allows removable baffle 254 to be removed from mounting baffle 252.

Mounting baffle first side segment outer edge 286 is the outer edge of mounting baffle first side segment 260 and is rigidly, sealingly attached to first side wall 20. Mounting baffle second side segment outer edge 290 is the outer edge of mounting baffle second side segment 264 and is rigidly, sealingly attached to second side wall 22. The mounting baffle bottom segment outer edge 292 is the outer edge of mounting baffle bottom segment 266 and is rigidly, sealingly attached to lower wall 18.

Adjacent compound baffle assembly 224 is a replication of compound baffle assembly 114. Adjacent compound baffle assembly 224 comprises adjacent mounting baffle 302, a portion of which has been cutaway, and adjacent removable baffle 304. The cutaway within adjacent mounting baffle 302 allows a portion of the removable baffle bolting apertures 282 located within adjacent mounting baffle 302 to be seen.

A multiple-effect still comprises a multiplicity of effects of similar construction. A multiplicity of effects 12 can be placed within shell 240 by replicating compound baffle assembly 214. The first replication of compound baffle assembly 214 becomes adjacent compound baffle assembly 224. Subsequent replications are not shown, but each new replication defines one additional effect; one skilled in the art of multiple-effect stills may readily understand the methodology described.

Because adjacent compound baffle assembly 224 is a replication compound baffle assembly 214, all of the description for compound baffle assembly 214 applies to compound baffle assembly 224 and will not be repeated.

Top plate 230 is shown as removable; this allows access into vapor-tight chamber 10 for maintenance, including removal of removable baffle 254 from the still when needed. A first flange 340 with first flange gasket 342 is sealingly fastened to the top of first side plate 234. A second flange 350 with second flange gasket 352 is sealingly fastened to the top of second side plate 236. A baffle flange 360 with baffle flange gasket 362 is sealingly fastened to mounting baffle upper segment outer edge 288 of mounting baffle 252. Replication of mounting baffle 252 as discussed above includes replication of baffle flange 360 and baffle flange gasket 362.

A multiplicity of flange bolting apertures 366 are located close to the outer edges of first flange 340 and second flange 350. Likewise, there are a multiplicity of top plate bolting apertures 368; these correspond in number, size, and location to the flange bolting apertures 366. When top plate 230 is placed with proper alignment onto first flange 340 and second flange 250, flange bolts 370 may be inserted through flange bolting apertures 366 and top plate bolting apertures 368. Then flange nuts 372 may be installed on flange bolts 370 and tightened.

First flange gasket 342 provides a vapor-tight seal between first flange 340 and top plate 230. Second flange gasket 352 provides a vapor-tight seal between second flange 350 and top plate 230. Baffle flange gasket 362 provides a vapor-tight seal between baffle flange 360 and top plate 230.

An optional separating wall 374 is rigidly sealed to the lower end of containment box 242 by rigidly, sealingly joining a first end of separating wall 374 to the lower portion of first side wall 20, the bottom of separating wall 374 to lower wall 18 of bottom plate 232, and the second end of separating wall 374 to the lower portion of second side wall 22.

FIG. 2 illustrates and the discussion describes the preferred embodiment of a removable top plate. It is understood that one versed in the art may apply the technology herein disclosed to a removable side plate, with a removable baffle which exits through the side. A removable top plate is preferred because proper alignment of removable baffle 254 with mounting baffle 252 during maintenance operations is normally easier with top access. In those applications where installation of a unit is in a location with height restrictions, such as the interior of a building with limited ceiling height, access from the side may be necessary.

Figure 3:
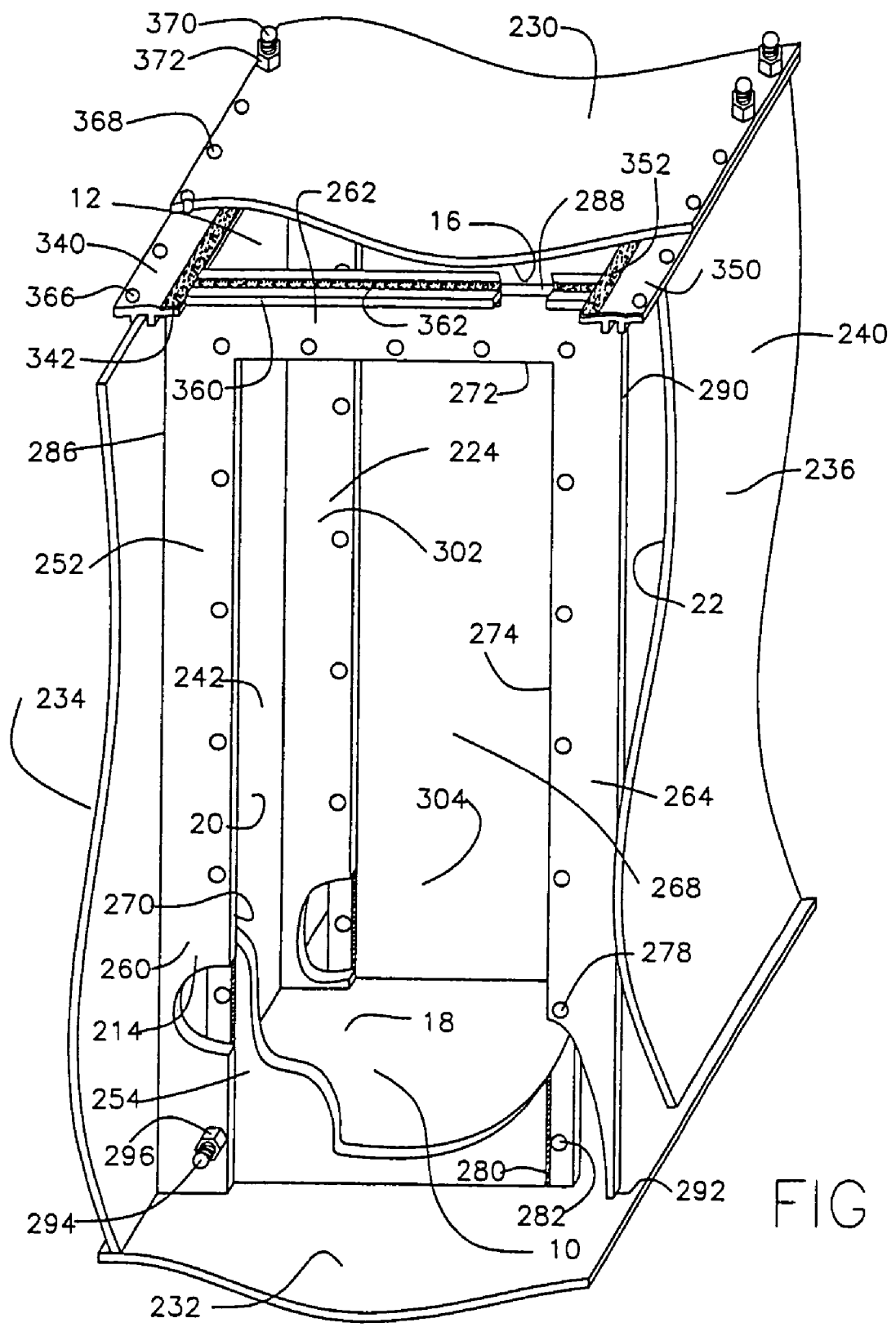
FIG. 3 is a perspective view of a second embodiment of a structure for multiple-effect distillation in accordance with the present invention.

FIG. 3 illustrates a second embodiment of a structure defining a vapor-tight chamber 10 for an effect module 12. In FIG. 3 all of the components are the same as in FIG. 2 except as follows. In this second embodiment the segment of the mounting baffle opposite the removable baffle plate is eliminated and the extent of the removable baffle is increased in compensation. Thus, in FIG. 3 the mounting baffle bottom segment 266 of the embodiment of FIG. 2, which is opposite the removable top plate 230, has been eliminated and removable baffle 254 now extends to lower wall 18. Cutaways in mounting baffle first side segment 260 and mounting baffle second side segment 264 allow both side edges of removable baffle 254 to be seen.

In large systems with a span of many feet between first side wall 20 and second side wall 22, the first embodiment of FIG. 2 is preferred because the greater forces and bending moments on structural elements associated with the larger dimensions favor the increased stiffness possible with a discrete mounting baffle bottom segment 266. In smaller systems, where the forces and bending moments are not so great, the simpler structure of the second embodiment can be favored.

Figure 4:
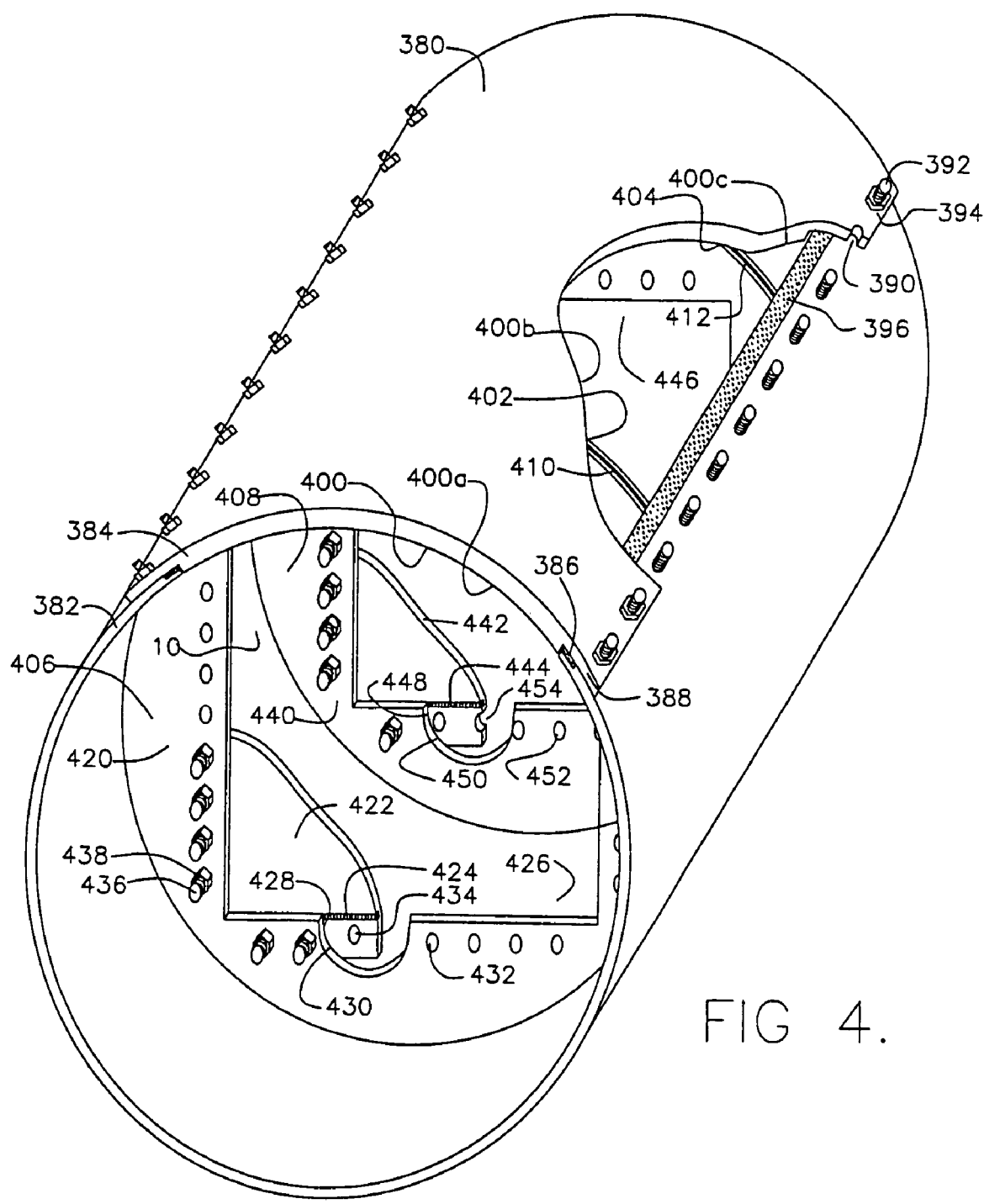
FIG. 4 is a perspective view of a third embodiment of a structure for multiple-effect distillation in accordance with the present invention.

FIG. 4 illustrates a third embodiment of a vapor-tight chamber 10, this embodiment featuring a cylindrical shell 380 instead of a rectangular shell 240 as in the previous embodiments. Cylindrical shell 380 comprises a fixed shell segment 382 and a removable shell segment 384; together they provide complete external, axial containment of vapor-tight chamber 10.

Removable shell segment 384 overlaps fixed shell segment 382 sufficiently to provide a sealing surface 386 and a fastening region 388, fastening region 388 provides apertures 390 for the passage of bolts 392 fastened (stud welding preferred to minimize leakage potential) to fixed shell segment 382. Nuts 394 are inserted on bolts 392 and tightened in order to sealingly secure removable shell segment 384 to fixed shell segment 382. A gasket 396 may be used to effect the seal.

Cylindrical shell 380 typically extends over a multiplicity of effects, and is divided into a series of cylindrical containment boxes 400, such that that portion of cylindrical shell 380 used as the external wall of the vapor-tight chamber 10 of a particular effect comprises the cylindrical containment box 400 for that effect. The illustration shows three such containment boxes 400a, 400b, and 400c. The internal boundaries (the effect boundaries) of a containment box 400 have a first open end 402 and a second open end 404. Note that the second open end 404 of one effect comprises the first open end 402 of an adjacent effect.

Vapor-tight chamber 10 is internally bounded at its first open end 402 by a first cylindrical compound baffle 406. First cylindrical compound baffle 406 extends outward to and is sealingly joined to the internal surface of containment box 400 at first open end 402. Vapor-tight chamber 10 is internally bounded at its second open end 404 by a second cylindrical compound baffle 408. Second cylindrical compound baffle 408 extends outward to and is sealingly joined to the internal surface of containment box 400 at second open end 404. Note that the second cylindrical compound baffle 408 of one effect comprises the first cylindrical compound baffle 406 of an adjacent effect.

First cylindrical compound baffle 406 has gasket 410 to seal against box 400. Second cylindrical compound baffle 408 has gasket 412 to seal against box 400.

First cylindrical compound baffle 406 comprises first cylindrical mounting baffle 420 and first cylindrical removable baffle 422. Gasket 424 seals between first cylindrical mounting baffle 420 and first cylindrical removable baffle 422. First cylindrical mounting baffle 420 has a first cylindrical mounting baffle aperture 426, the size and position requirements of mounting baffle apertures will be explained in the description of later figures. First cylindrical removable baffle 422 completely covers first cylindrical mounting baffle aperture 426 and extends to also overlap cylindrical mounting baffle sealing surface 428 and mounting baffle fastening region 430. There are a multiplicity of first cylindrical mounting baffle bolt apertures 432 in mounting baffle fastening region 430, together they encompass first cylindrical mounting baffle aperture 426. First cylindrical removable baffle 422 has a multiplicity of first cylindrical removable baffle bolt apertures 434 which corresponding in number and location to first cylindrical mounting baffle bolt apertures 432, such that when first cylindrical removable baffle 422 is placed against first cylindrical mounting baffle 420 with proper alignment, bolts 436 may be inserted through first cylindrical mounting baffle bolt apertures 432 and first cylindrical removable baffle bolt apertures 434, nuts 438 may be inserted on bolts 436 and tightened, thus sealingly joining first cylindrical removable baffle 422 to first cylindrical mounting baffle 420.

Second cylindrical compound baffle 406 comprises second cylindrical mounting baffle 440 and second cylindrical removable baffle 442. Gasket 444 seals between second cylindrical mounting baffle 440 and second cylindrical removable baffle 442. Second cylindrical mounting baffle 440 has a second cylindrical mounting baffle aperture 446, the size and position requirements of mounting baffle apertures will be explained in the description of later figures. Second cylindrical removable baffle 442 completely covers second cylindrical mounting baffle aperture 446 and extends to also overlap cylindrical mounting baffle sealing surface 448 and mounting baffle fastening region 450. There are a multiplicity of second cylindrical mounting baffle bolt apertures 452 in mounting baffle fastening region 450, together they encompass second cylindrical mounting baffle aperture 446. Second cylindrical removable baffle 442 has a multiplicity of second cylindrical removable baffle bolt apertures 454 which corresponding in number and location to second cylindrical mounting baffle bolt apertures 452, such that when second cylindrical removable baffle 442 is placed against second cylindrical mounting baffle 440 with proper alignment, bolts 456 may be inserted through second cylindrical removable baffle bolt apertures 454 and second cylindrical mounting baffle bolt apertures 452, nuts 458 may be inserted on bolts 456 and tightened, thus sealingly joining second cylindrical removable baffle 442 to second cylindrical mounting baffle 440.

Figure 5:
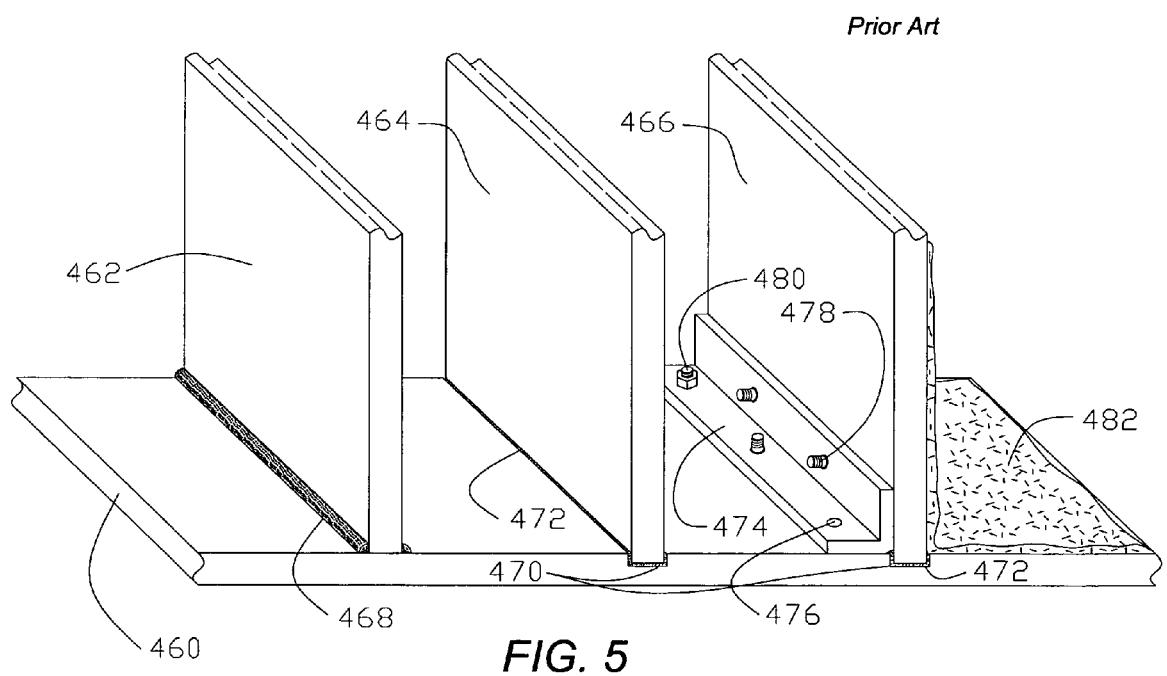
FIG. 5 is a perspective view illustrating methods commonly known in the art to fasten one plate to another.

FIG. 5 is a review of methods commonly known in the art to fasten one plate to another. In a number of junctions between elements in the above 2 embodiments is the requirement that a plate or mounting baffle edge be "rigidly, sealingly mounted" to another object. There are many ways known to the art of joining metals; three are shown here for reference. A plate 460, which may be representative of top plate 230, bottom plate 232, first side plate 234 or second side plate 236, is rigidly mounted to plate 462, plate 464, and plate 466 using various joining techniques; these second groups of plates may be representative of top plate 230, bottom plate 232, first side plate 234 second side plate 236 or an edge of mounting baffle 252.

In the first example, the case of the junction of plate 460 with plate 462, a bead 468 is welded onto the plates to provide rigidity and sealing. In larger systems with thick plates this can be a preferred methodology; however in small systems with thin plates warpage can become a difficult problem to surmount, in which case alternative methodology is preferred. Thus, in the second example, that of joining plate 464 with plate 460, a slot 470 is first machined into plate 460. Then cement 472 is applied to plate 460 within the confines of slot 470. Next plate 464 is inserted into plate 460. This methodology can be suitable for joining mounting baffles to walls. It is inadequate for joining plates to plates.

A third example is that illustrated whereby plate 466 is sealingly and rigidly joined to plate 460. This is much stronger than the second example and is more appropriate in the case of joining first side plate 234 to bottom plate 232 or joining second side plate 236 to bottom plate 232. Similar to the second example, the third example also uses a slot 470 and cement 472. However, additional strength and rigidity is providing by fastening bracket 474 to both plate 460 and plate 466. A multiplicity of apertures 476 are provided within bracket 474 for insertion of stud bolts 478; a portion of stud bolts 478 is stud welded to plate 460 and another portion is welded to plate 466. Note that the stud welding can be performed after the plate 466 has been cemented into place in slot 470 of plate 460; typically, stud welding will take place before the cement has set. Nuts 480 are then inserted onto stud bolts 478 and permanently tightened. Optionally additional strength may be obtained by spraying a coating 482 comprising a chopped fiber-glass impregnated epoxy or equivalent. Coating 482 not only provides an extra level of sealing and strength in the joints, but also provides corrosion resistance and thermal resistance.

Figure 6:
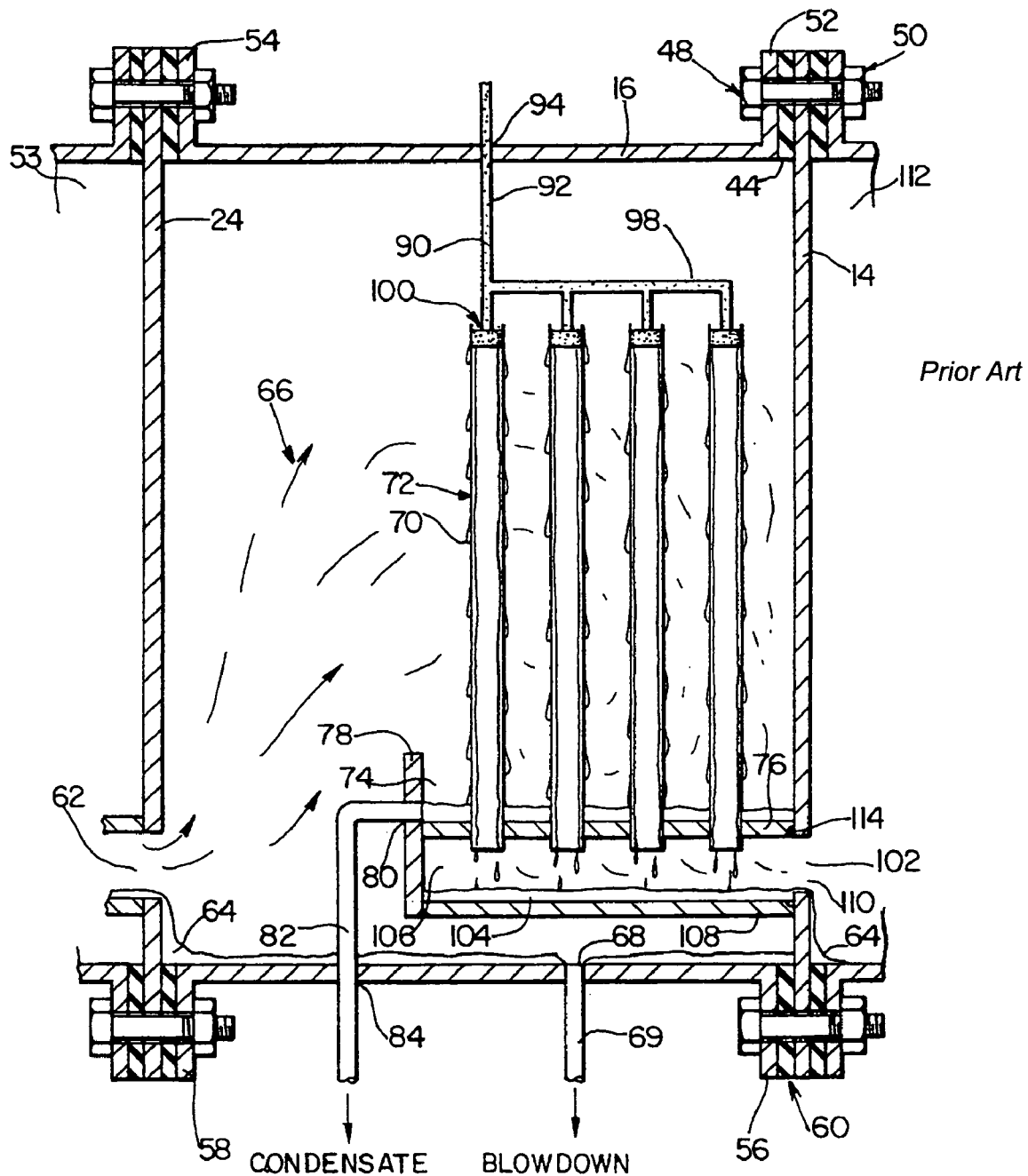
FIG. 6 is a perspective front view of the structure for multiple-effect distillation of FIG. 1, shown with access door open and tube attached.

In FIG. 6, which is the FIG. 2 of the prior art patent and disclosed as reference, the first baffle 24 is fastened along its inside surface by one of the bolts 48 with one of the nuts 50 to upper wall 16 by means of a first flange 52 which is a perpendicular extension of upper wall 16 at first end 44. Similarly, second baffle 24 is fastened along what will be considered its outer surface, thus making its inner surface that surface which faces the adjacent effect 53, which is partially illustrated, to upper wall 16 by means of a second flange 54, which is likewise an extension of upper wall 16 at its second end 46. A third flange 56 and fourth flange 58, which are extensions of lower wall 18, are similarly used to connect baffles 14 and 24 to lower wall 18. Gaskets 60 are inserted between the baffles 14 and 24 and the flanges 48, 54, 56, and 58 in order to effect a vapor-tight seal.

Aperture 62 is provided in second baffle 24 to allow the flow of blowdown distilland 64 and evaporate 66 across the second baffle 24 from the adjacent, leftward effect 53. Blowdown exhaust port 68 and blowdown tube 69 are provided in lower wall 18 to allow the removal from the effect module 12 of blowdown distilland 64 as well as any condensate forming on the side walls 20 and 22 (not illustrated in this figure but understood from the discussion for FIG. 1) which has flowed to the bottom of chamber 10.

Evaporate 66 will flow through chamber 10 until it condenses as condensate 70 on the outer edges of heat exchanger tubes 72, from which it flows into upper accumulator 74. A tube sheet 76 supports heat exchanger tubes 72 which are inserted within it. Upper accumulator 74 is bounded on the bottom by tube sheet 76, on one side by the inside surface of first baffle 24, and by sides 78, of which the side opposing said first baffle 24 is shown; upper accumulator 74 opens at the top into chamber 10. An upper accumulator port 80 is provided within side 78 to allow condensate 70 to flow down condensate tube 82, through condensate exhaust port 84 within lower wall 18, and out of the module 12.

Supply distilland 90 is conveyed by a distilland tube 92 through a distilland port 94 in upper wall 16 to distilland manifold 98 and then to each of the distribution plugs 100 found inserted at the upper end of each of the heat exchanger tubes 72. (FIG. 6 will give an expanded view of distribution plug 100). Distribution plugs 100 provide a vapor tight seal between the interior of heat exchanger tubes 72 and chamber 10 and also apply distilland 90 as a film 101 to the interior walls of each of the heat exchanger tubes 72.

As distilland 90 flows down the interior walls of heat exchanger tubes 72 it partially evaporates; evaporate 102 and blowdown distilland 104 flow out of the bottom of heat exchanger tubes 72 into a lower accumulator 106. Lower accumulator 106 is bounded at the top by tube sheet 76, on the bottom by plate 208, around three of the edges by sides 78, and on the fourth edge by the inside surface of first baffle 24. An aperture 110 is placed in first baffle 24 within that portion of the baffle which is part of lower accumulator 106; evaporate 102 and blowdown distilland 104 pass out of lower accumulator 106, through aperture 110, and into the next adjacent rightward effect 112. Notice that as an evaporate 102 and blowdown distilland 104 pass through aperture 100 of first baffle 24 of one effect, they become the evaporate 66 and blowdown distilland 64 passing through the aperture 62 of second baffle 24 for the adjacent effect. Weld 114 wraps around the junction of lower accumulator 106 with first baffle 24 in order to produce a vapor-tight joint so that fluids may not pass freely between the lower accumulator 106 and chamber 10 of the same effect.

When the condensate is being condensed in a large chamber such as chamber 10, turbulence will tend to keep non-condensables mixed with the evaporate 66. If sufficient suction is applied to blowdown tube 69 and condensate tube 82 then a portion of the evaporate 66 will be removed from chamber 10 through the tubes 69 and 82 and this can of itself be sufficient to keep the concentration of non-condensables under control. If a separate exhaust port is desired to remove the non-condensable gasses, the art to implement this is well understood and thus is not illustrated.

Figure 7:
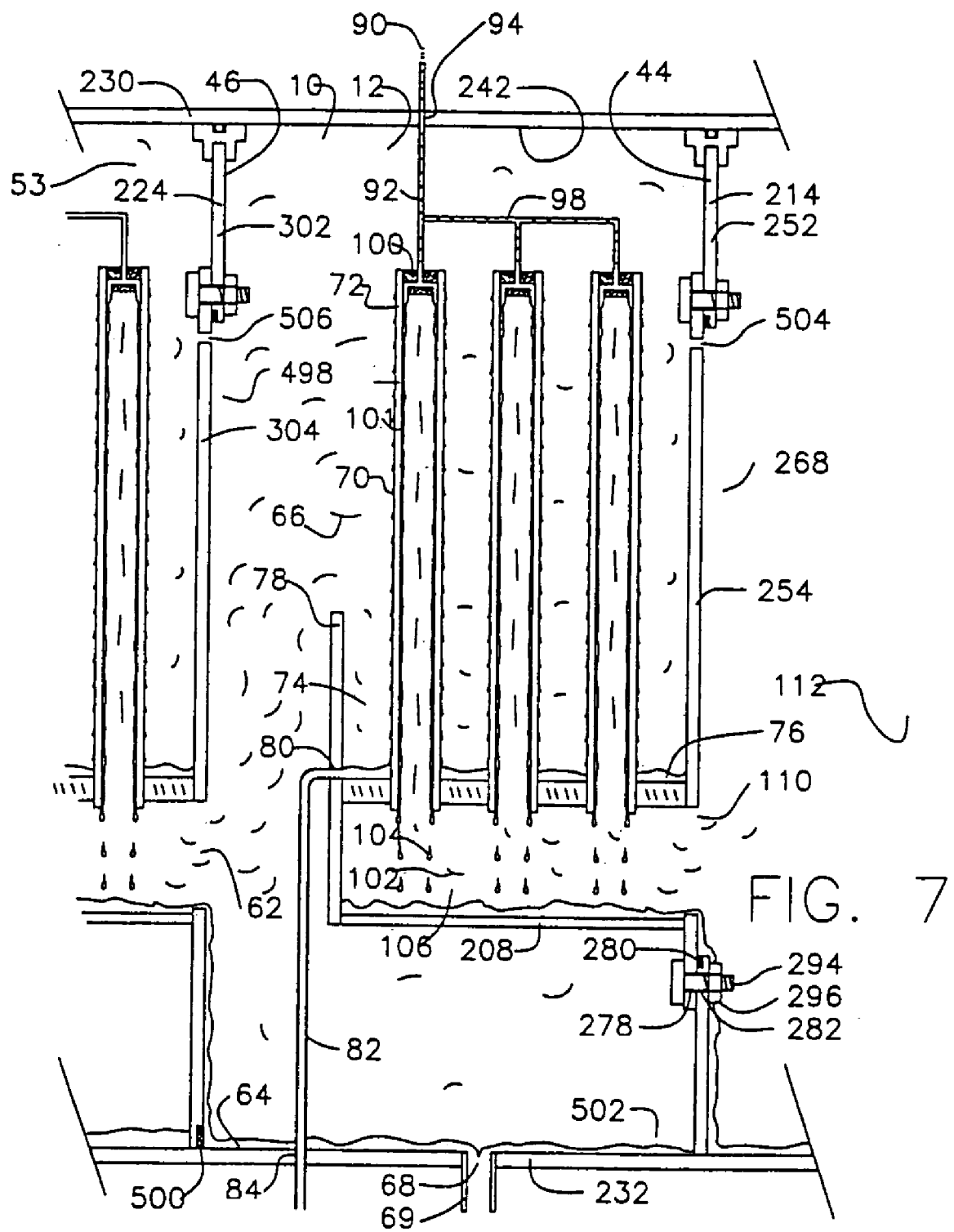
FIG. 7 is a perspective front view of the structure for multiple-effect distillation in accordance with the present invention, shown with access door open and tube attached.

FIG. 7 corresponds to FIG. 6, which showed the first embodiment of the prior invention for reference, but shows the improvements of this invention.

A vapor-tight chamber 10 of effect module 12 is bounded by containment box 242, by compound baffle assembly 214 located at first end 44 of containment box 242, and by adjacent compound baffle assembly 224 located at second end 46 of containment box 242, with containment box 242 comprising a portion of top plate 230 and a portion of bottom plate 232 and beginning at first end 44 and ending at second end 46. Compound baffle assembly 214 comprises mounting baffle 242 and removable baffle 254. Adjacent compound baffle assembly 224 comprises adjacent mounting baffle 302 and adjacent removable baffle 304.

In FIG. 7, the adjacent compound baffle assembly 224 sealingly joins top plate 230 of containment box 242 by flange 360 and gasket 362 at second end 46. Since the still works under a vacuum, the forces of the external, ambient atmospheric pressure will keep top plate 230 pressed tightly against sealing gasket 362. The bottom portion of adjacent compound baffle 224 provides an example of the second embodiment of the shell as disclosed in FIG. 3, wherein adjacent removable baffle 304 extends directly to bottom plate 232 and seals against it with gasket 500.

Similarly, compound baffle assembly 214 sealingly joins top plate 230 of containment box 242 by flange 360 and gasket 362 at first end 44. The bottom portion of compound baffle 214 provides an example of the first embodiment of the shell as disclosed in FIG. 2, wherein adjacent removable baffle 304 is sealingly fastened to mounting baffle 302 which in turn is rigidly, sealingly joined to bottom plate 232.

Aperture 62 is provided in adjacent removable baffle 304 to allow the flow of blowdown distilland 64 and evaporate 66 across the adjacent removable baffle 304 from the adjacent, leftward effect 53. Note that adjacent mounting baffle aperture 498 must also be of sufficient size and proper location to allow unimpeded flow of blowdown distilland 64 and evaporate 66 across adjacent removable baffle 304. Blowdown distilland 64 flows to the bottom of chamber 10, where it is reaccumulated in secondary distilland accumulator 502, which is bounded by the lower portions of containment box 242 and the lower portions of compound baffle 214 and adjacent compound baffle 224. Blowdown distilland 64 is removed from effect module 12 through blowdown exhaust port 68 and blowdown tube 69.

Evaporate 66 will flow through chamber 10 until it condenses as condensate 70 on the outer edges of heat exchanger tubes 72, from which it flows into upper accumulator 74. A tube sheet 76 supports heat exchanger tubes 72 which are inserted within it. Upper accumulator 74 is bounded on the bottom by tube sheet 76, on one side by the inside surface of compound baffle assembly 214, and by sides 78, of which the side opposing said compound baffle assembly 214 is shown; upper accumulator 74 opens at the top into chamber 10. An upper accumulator port 80 is provided within side 78 to allow condensate 70 to flow down condensate tube 82, through condensate exhaust port 84 within lower wall 18, and out of the module 12.

Supply distilland 90 is conveyed by a distilland tube 92 through a distilland port 94 in upper wall 16 to distilland manifold 98 and then to each of the distribution plugs 100 found inserted at the upper end of each of the heat exchanger tubes 72. Distribution plugs 100 provide a vapor tight seal between the interior of heat exchanger tubes 72 and chamber 10 and also apply distilland 90 as a film 101 to the interior walls of each of the heat exchanger tubes 72.

As distilland 90 flows down the interior walls of heat exchanger tubes 72 it partially evaporates; evaporate 102 and blowdown distilland 104 flow out of the bottom of heat exchanger tubes 72 into a lower accumulator 106. Lower accumulator 106 is bounded at the top by tube sheet 76, on the bottom by plate 208, around three of the edges by sides 78, and on the fourth edge by the inside surface of compound baffle assembly 214. An aperture 110 is placed in compound baffle assembly 214 within that portion of the baffle which is part of lower accumulator 106; evaporate 102 and blowdown distilland 104 pass out of lower accumulator 106, through aperture 110, and into the next adjacent rightward effect 112. Notice that as an evaporate 102 and blowdown distilland 104 pass through aperture 100 of compound baffle assembly 214 of one effect, they become the evaporate 66 and blowdown distilland 64 passing through the aperture 62 of the adjacent compound baffle assembly 214 of the next adjacent rightward effect 112. Note that mounting baffle aperture 268 must also be of sufficient size and proper location to allow unimpeded flow of blowdown distilland 64 and evaporate 66 across removable baffle 254.

Non-condensable vapor port 504 is placed in the upper portion of removable baffle 254 for non-condensable vapors to pass from effect module 12 into the next adjacent rightward effect 112.

Likewise, adjacent non-condensable vapor port 506 is placed in the upper portion of adjacent removable baffle 304 for non-condensable vapors to pass from the adjacent, leftward effect 53 into effect module 12.

When the adjacent compound baffle assembly 224 is joined to box 242, it is oriented so that its connected tube sheet faces into adjacent leftward effect 53; the side connected to the tube sheet is called its inside surface and the opposite side is called its outside surface. When the compound baffle assembly 214 is joined to box 242, it is oriented so that its connected tube sheet faces into effect module 12; the side connected to the tube sheet is called its inside surface and the opposite side is called its outside surface.

In FIG. 8I show a second embodiment of the previous invention (called FIG. 4 in the previous patent), one in which the distilland flows on the outside of the heat exchanger tubes 72 and the condensate flows on the inside. This embodiment becomes the preferred embodiment if plastic heat exchanger tubes are used since the pressure is greater on the condensing surface of a heat exchanger than the evaporating surface and it is simpler to maintain the shape of the tubes if the inside pressure is greater than the outside pressure.

Figure 8:
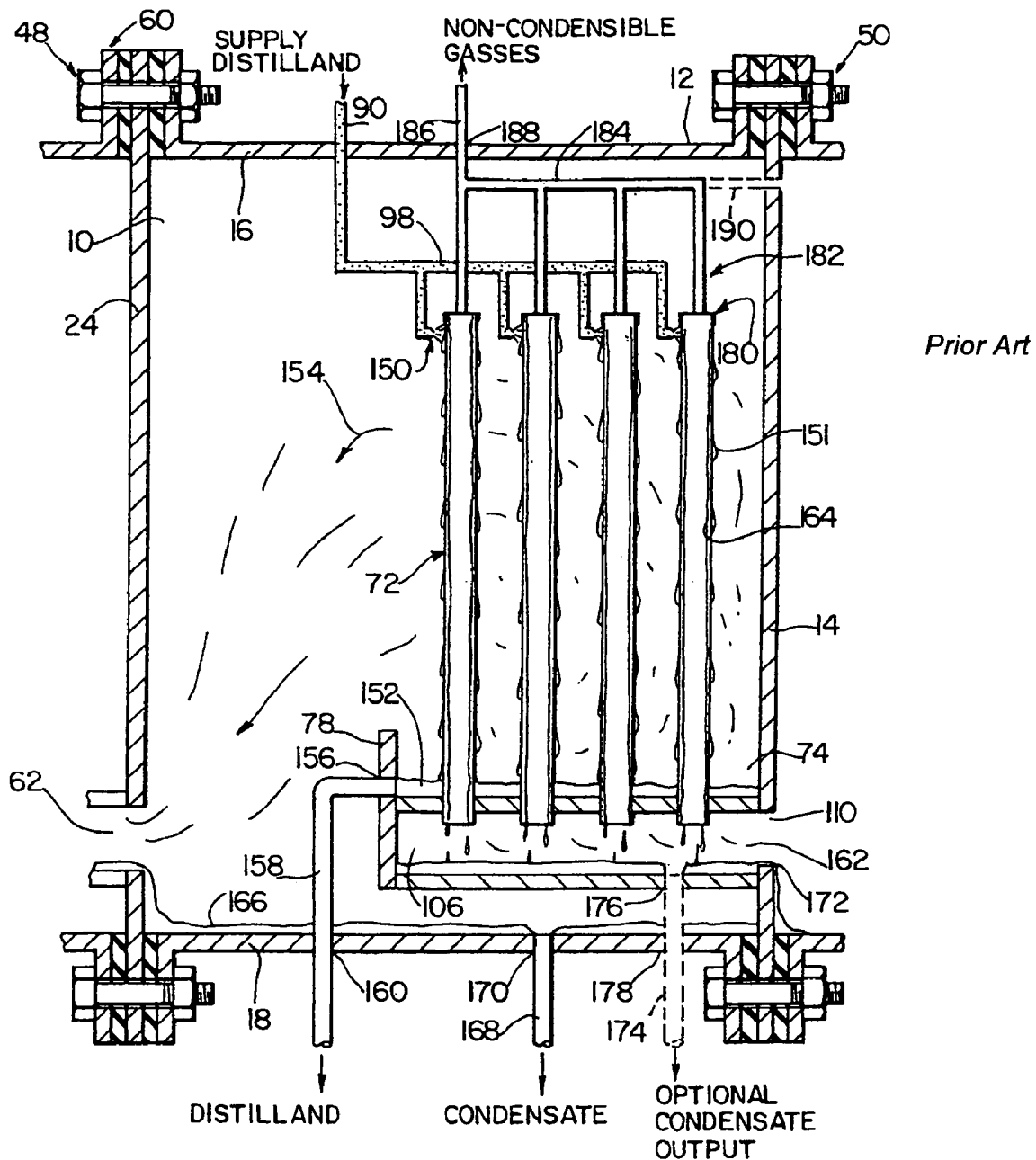
FIG. 8 is an enlarged view of the valve of the structure for multiple-effect distillation of FIG. 1.

In FIG. 8 all of the components are the same as in FIG. 6 except as follows.

Distribution manifold 98 distributes supply distilland 90 to nozzles 150 for spraying on the outsides of heat exchanger tubes 72 as distilland 151. After distilland 151 has flowed down the tubes 72, it is accumulated in upper accumulator 74 as blowdown distilland 152. Evaporate 154 given off by distilland 151 flows within chamber 10 until it reaches and flows through aperture 62 in second baffle 24. Blowdown distilland 152 is emptied from upper accumulator 74 through accumulator blowdown port 156 in side 78, through blowdown tube 158, and out blowdown port 160 in lower wall 18.

Incoming evaporate 162 enters aperture 110 of first baffle 24, flows through lower accumulator 106 and into heat exchanger tubes 72, whereon it condenses as condensate 164 which then flows down the tubes 72 into lower accumulator 106.

Condensate 164 flows out of lower accumulator 106 through aperture 110 of first baffle 24.

Condensate 166 flows into chamber 10 through aperture 62 in second baffle 24, collects on the floor of chamber 10, and is then removed by a condensate removal tube 168 through a condensate removal port 170 located in lower wall 18.

The following optional configuration may provide for a higher quality of condensate, as the product condensate will not be combined with condensate forming on the walls of chamber 10. Lip 172 holds condensate 164 within lower accumulator 106 until removal by product condensate removal tube 174 from a plate port 176 in plate 208 and out of the module 12 through product condensate removal port 178 in lower wall 18.

When an evaporate to be condensed enters one end of a long tube, non-condensable gasses will tend to concentrate at the far end of the tube and will not mix as readily as they will in a large chamber when condensation takes place on the outside of the tube. Thus, a means must be provided at the ends of the tubes for non-condensable gas removal.

Caps 180 with nipples 182 are inserted over the top ends of heat exchanger tubes 72 and made vapor-tight. Exhaust manifold 184 extends to and connects with each of the nipples 182 such that non-condensable gasses may flow out of the tubes 72 into exhaust manifold 184. Non-condensables exhaust tube 186 connects to exhaust manifold 184 and extends through non-condensable gas port 188 such that non-condensable gasses may flow from exhaust manifold 184 to the outside of the chamber 10. It is also known in the art to exhaust non-condensable gasses to a lower pressure effect, such as through an optional tube 190 through optional port 192 in first baffle 24.

Figure 9:
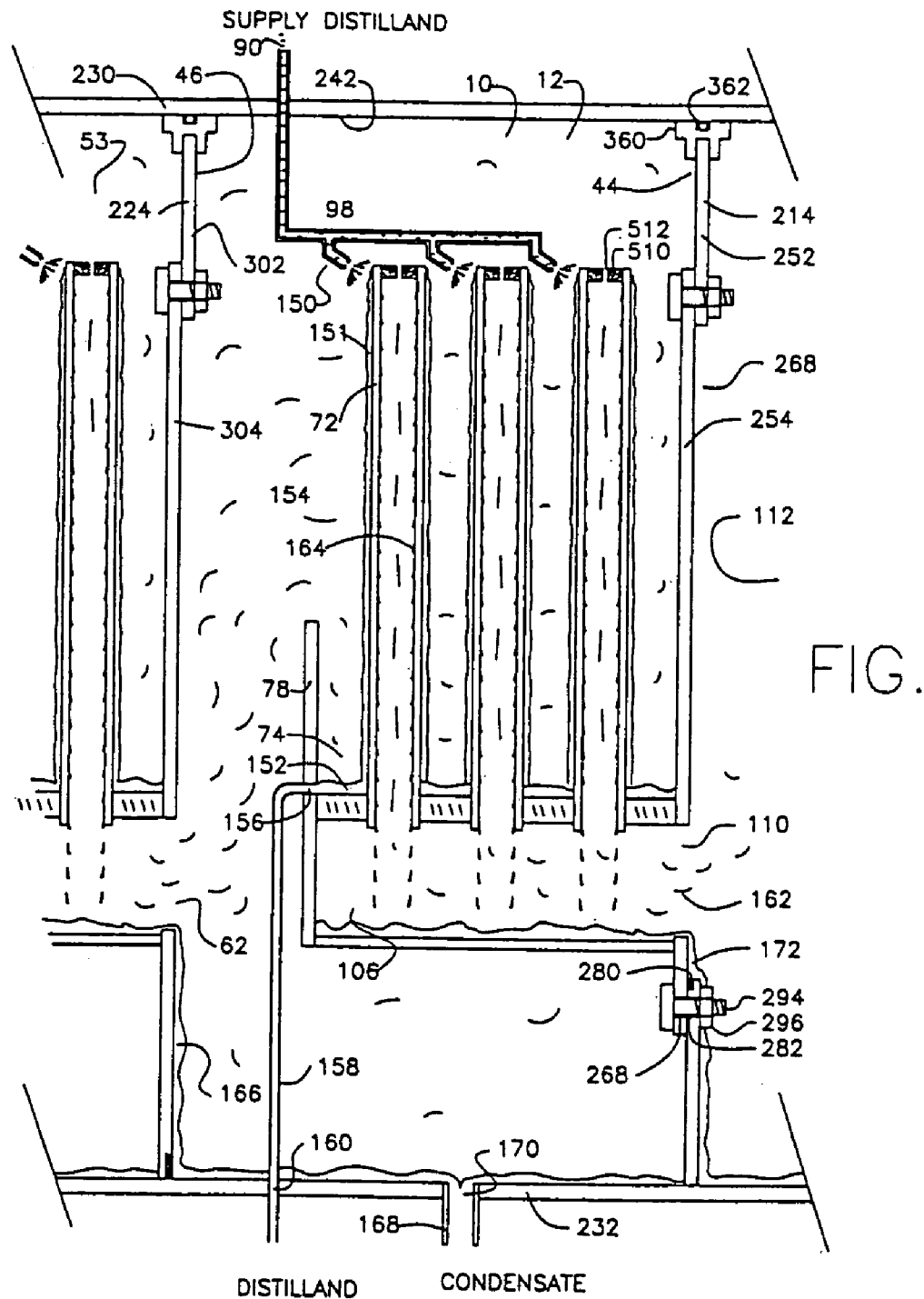
FIG. 9 is an enlarged view of the valve of the structure for multiple-effect distillation in accordance with the present invention.

FIG. 9 corresponds to FIG. 8, which showed a second embodiment of the prior invention for reference, but shows the improvements of this invention. In this embodiment the distilland flows on the outside of the heat exchanger tubes 72 and the condensate flows on the inside. This embodiment becomes the preferred embodiment if thin plastic heat exchanger tubes are used since the pressure is greater on the condensing surface of a heat exchanger than the evaporating surface and it is simpler to maintain the shape of the tubes if the inside pressure is greater than the outside pressure.

In FIG. 9 all of the components are the same as in FIG. 7 except as follows.

Distribution manifold 98 distributes supply distilland 90 to nozzles 150 for spraying on the outsides of heat exchanger tubes 72 as distilland 151. After distilland 151 has flowed down the tubes 72, it is accumulated in upper accumulator 74 as blowdown distilland 152. Evaporate 154 given off by distilland 151 flows within chamber 10 until it reaches and flows through aperture 62 in adjacent removable baffle 304. Blowdown distilland 152 is emptied from upper accumulator 74 through accumulator blowdown port 156 in side 78, through blowdown tube 158, and out blowdown port 160 in bottom of vapor-tight chamber 10.

Incoming evaporate 162 enters aperture 110 of removable baffle 254, flows through lower accumulator 106 and into heat exchanger tubes 72, whereon it condenses as condensate 164 which then flows down the tubes 72 into lower accumulator 106.

Condensate 164 flows out of lower accumulator 106 through aperture 110 of removable baffle 254.

Condensate 166 flows into vapor-tight chamber 10 through aperture 62 in adjacent removable baffle 304, collects on the floor of vapor-tight chamber 10, and is then removed by a condensate removal tube 168 through a condensate removal port 170 located in bottom of vapor-tight chamber 10.

When an evaporate to be condensed enters one end of a long tube, non-condensable gasses will tend to concentrate at the far end of the tube and will not mix as readily as they will in a large chamber when condensation takes place on the outside of the tube. Thus, a means must be provided at the ends of the tubes for non-condensable gas removal.

Plugs 510 are inserted over the top ends of heat exchanger tubes 72 and made vapor-tight. Ports 512 in plugs 510 provide a path for non-condensable gasses to flow out of the tubes 72 into chamber 10, in accordance with standard practice in the art of multiple-effect stills.

Figure 10:
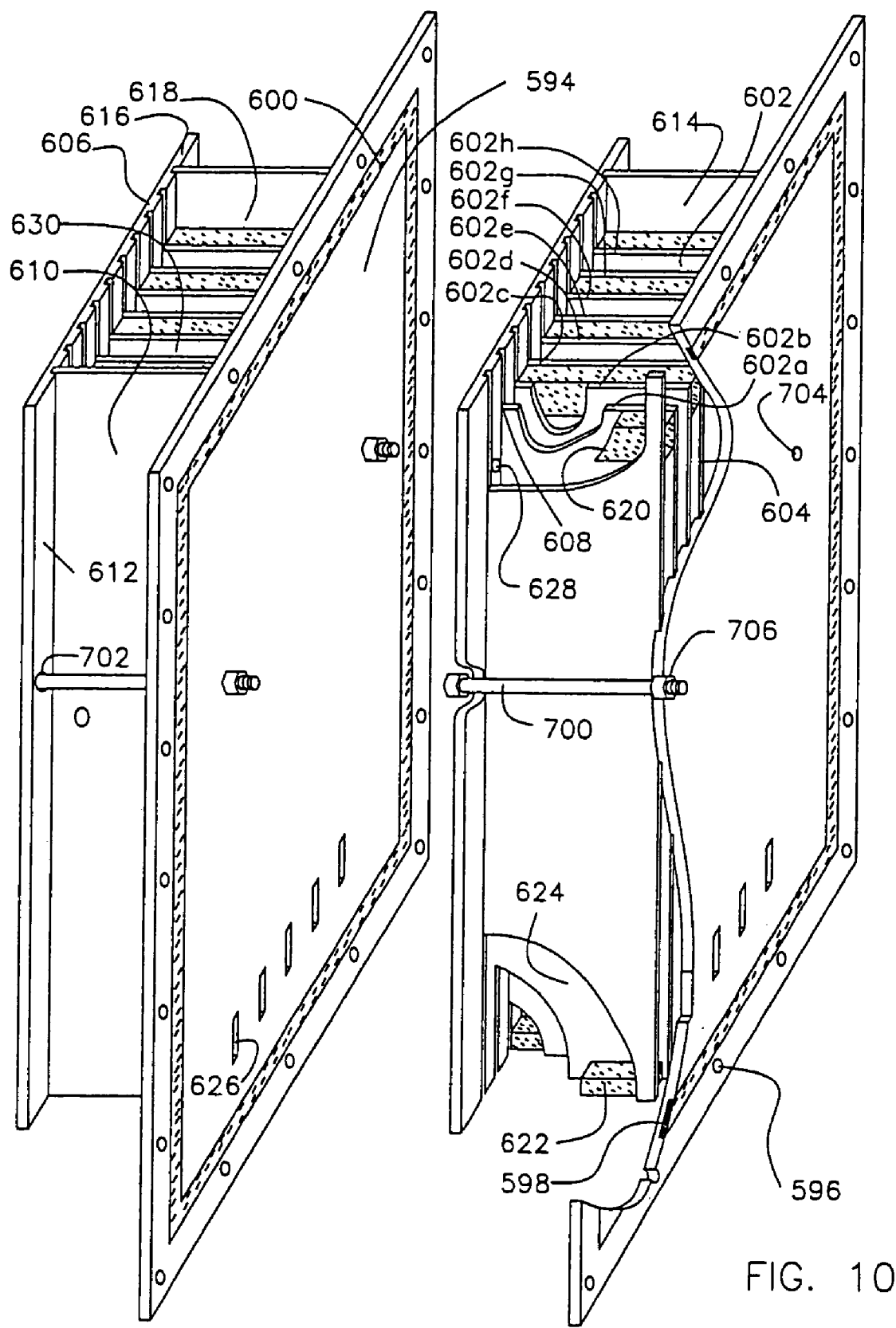
FIG. 10 is a perspective view of an alternate embodiment of a heat exchanger mounted on a removable baffle in accordance with the present invention, wherein the heat exchange elements comprise plates instead of tubes.

FIG. 10 shows a fourth embodiment, wherein the heat exchange elements comprise plates instead of tubes. Two illustrations of the same components are provided; that on the left side is without cutouts and that on the right has cutouts in some components. For clarity a given number will be shown on only one of the illustrations, but it is to be understood that both illustrations are of the same components and a number on one illustration is understood to apply as well to the other.

Removable baffle 594 corresponds to and replaces the removable baffle 254 of the earlier embodiments, mounting onto mounting baffle 252 to form an alternative embodiment of compound baffle assembly 214 as was illustrated in FIG. 2. Removable baffle bolting apertures 596 are the equivalent of removable baffle bolting apertures 282.

Gasket slot 598 provides a recess into which gasket 600 may be placed. Gasket 600 is the equivalent of baffle gasket 280 of the earlier embodiments. Thus, when removable baffle 594 is aligned with and fastened to mounting baffle 252, gasket 600 should be covering mounting baffle sealing surface 279 and providing a vapor-tight seal.

A multiplicity of vertically-oriented heat exchange plates 602 of the same width and height are spaced from each other at regular intervals, orthogonal to removable baffle 594, and rigidly, sealingly joined to removable baffle 594 along a first vertical edge 604. Heat exchange plates 602 are rigidly, sealingly joined to containment plate 606 along their second vertical edges 608. For purposes of discussion individual plates 602a, 602b, 602c, 602d, 602e, 602f, 602g, and 602h are also identified. Note that the actual number of plates in a system is a matter of application and the number shown in the FIG. 10 is only representative, not definitive. As illustrated, heat exchange plates 602 are joined to containment plate 606 and removable baffle 594 in a manner similar to that of plate 464 joining plate 460 in FIG. 5. Alternate joining embodiments will be illustrated in FIG. 13 and FIG. 14.

Containment plate 606 is longer than heat exchange plates 602. When joined, containment plate 606 is flush with heat exchange plates 602 along their bottom edges, but rises above the tops of heat exchange plates 602 at the upper end as illustrated. Heat exchange plate 610 is similar to heat exchange plates 602 except that it is of the same length as containment plate 606. It is rigidly, sealingly joined to removable baffle 594 along one vertical edge and similarly joined to containment plate 606, flush with containment plate 606 at both the top and bottom. Heat exchange plate 610 is the closest of the heat exchange plates to the first vertical edge 612 of containment plate 606.

Heat exchange plate 614 is the same size as heat exchange plate 612 and is joined to removable baffle 594 and containment plate 606 in a manner similar to that of heat exchange plate 610, except that heat exchange plate 614 is the closest of the heat exchange plates to the second vertical edge 616 of containment plate 606. That portion of heat exchange plate 610, heat exchange plate 614, containment plate 606, and corresponding portions of removable baffle 594 in their joined combination define a distribution box 618.

A top plug 620 is inserted between and extends to join sealingly containment plate 606, heat exchange plate 610, the heat exchange plate 602a, and removable baffle 594. The top edge of top plug 620 should be level with the top edge of heat exchange plate 602a.

A bottom plug 622 is inserted between extends to join sealingly containment plate 606, heat exchange plate 610, the heat exchange plate 602a, and removable baffle 594. The bottom edge of bottom plug 622 should be level with the bottom edge of heat exchange plate 602a.

A vapor-tight condensation chamber 624 is formed and bounded by containment plate 606, heat exchange plate 610, the heat exchange plate 602a, removable baffle 594, top plug 620 and bottom plug 622. Top plug 620 and bottom plug 622 should be constructed with the smallest vertical dimensions possible that still provide reliable sealing capability.

Within the confines of condensation chamber 624 a condensation chamber fluid aperture 626 is located in removable baffle 594. Condensation chamber fluid aperture 626 allows evaporate from the previous effect to pass through removable baffle 594 and into the local effect in order to be condensed. Likewise, condensed evaporate is removed from condensation chamber 624 by flowing through condensation chamber fluid aperture 626. Details will be illustrated in FIG. 12. A non-condensable gas port 628 is provided at the top of condensation chamber for the removal of non-condensable gasses from the chamber.

Figure 15:
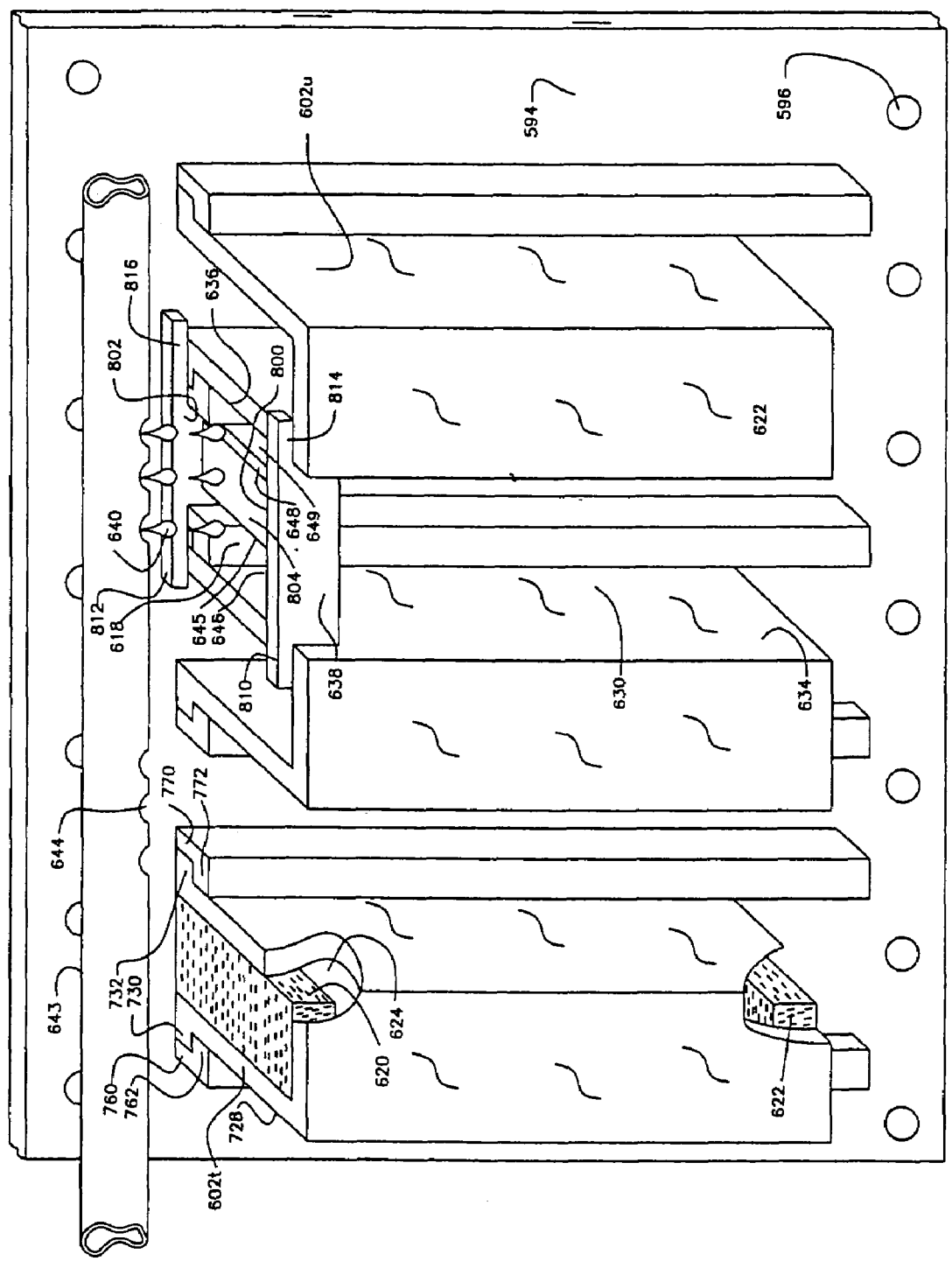
FIG. 15 is a more detailed view showing how the extruded removable baffle of FIG. 14 is used.
Figure 16:
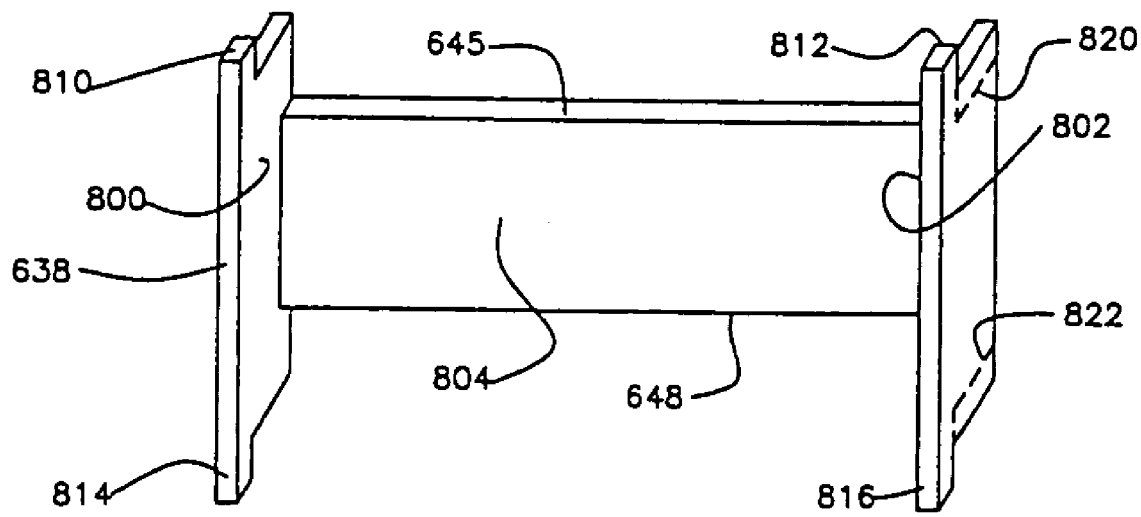
FIG. 16 is a perspective view of a stand alone distilland applicator as shown in FIG. 15.

An evaporation chamber 630 is formed and bounded by containment plate 606, heat exchange plate 602*a*, heat exchange plate 602*b*, and removable baffle 594. Not shown here for the sake of clarity but shown in FIG. 11, FIG. 15, and FIG. 16 is a component for applying and controlling the flow of distilland into evaporation chamber 630.

The succession of heat exchange plates 602 across removable baffle 594 and containment plate 606 form a series of alternating condensation chambers 624 and evaporation chambers 630 as illustrated. Each of the condensation chambers 624 is bounded by a top plug 620 and bottom plug 622, has a condensation chamber fluid aperture 626, and has a non-condensable gas port 628.

In order to increase the strength with which containment plate 606 is fastened to heat exchanger plates 602 and with which heat exchanger plates 602 are fastened to removable baffle 594, optional bolts 700 may pass through apertures 702 in containment plate 606 and through apertures 704 in removable baffle 594. Nuts 706 are placed on bolts 700 and tightened.

Figure 11:
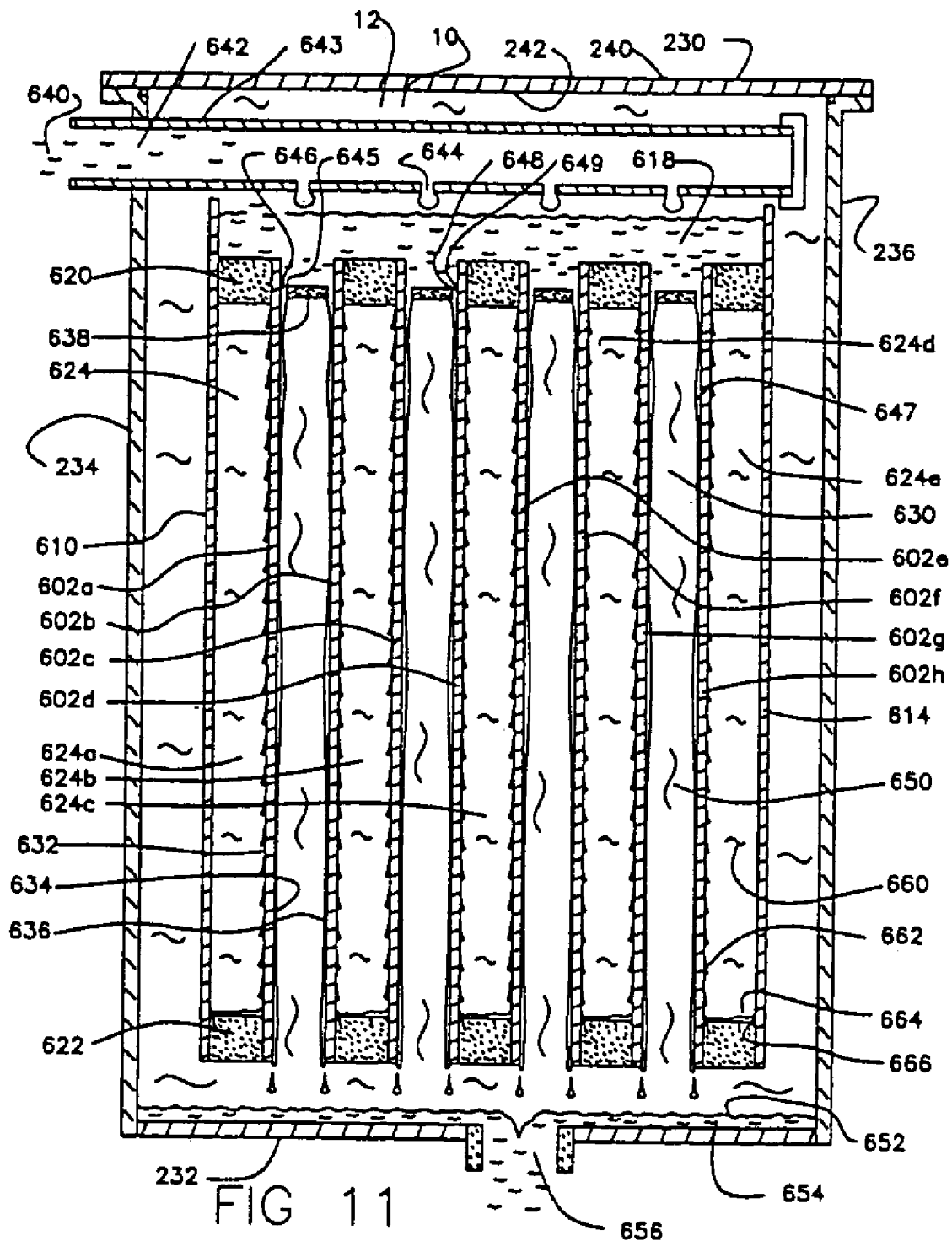
FIG. 11 is a cross-sectional view of a component for applying and controlling the flow of distilland into the evaporation chamber of the structure for multiple-effect distillation of FIG. 10.

In FIG. 11 vapor-tight chamber 10 comprises top plate 230, bottom plate 232, first side wall 234 and second side wall 236, which in turn comprise box 242 of shell 240. A condensation chamber 624*a* is bounded by heat exchange plate 610, heat exchange plate 602*a*, a top plug 620 and bottom plug 622. A second condensation chamber 624*b* is bounded by heat exchange plate 602*b*, heat exchange plate 602*c*, a top plug 620 and bottom plug 622. A third condensation chamber 624*c* is bounded by heat exchange plate 602*d*, heat exchange plate 602*e*, a top plug 620 and bottom plug 622. A fourth condensation chamber 624*e* is bounded by heat exchange plate 602*f*, heat exchange plate 602*g*, a top plug 620 and bottom plug 622. A fifth and final condensation chamber 624*f* is bounded by heat exchange plate 602*h*, heat exchange plate 614, a top plug 620 and bottom plug 622. Those faces of heat exchange plates 602 which lie within a condensation chamber 624 are called condensation surfaces 632.

Evaporation chambers 630 are bounded by a first heat exchange surface 634 to their left and a second heat exchange surface 636 to their right and have a distilland applicator 638 inserted at their top ends. In the first of the four illustrated heat exchangers 630, first heat exchange surface 634 comprises the surface of heat exchange plate 602*a* which bounds evaporation chamber 630 and second heat exchange surface 636 comprises the surface of heat exchange plate 602*b* which bounds evaporation chamber 630. In the second of the heat exchangers 630, first heat exchange surface 634 comprises the surface of heat exchange plate 602*c* which bounds a first evaporation chamber 630 and second heat exchange surface 636 comprises the surface of heat exchange plate 602*d* which bounds a second evaporation chamber 630. In the third of the heat exchangers 630, first heat exchange surface 634 comprises the surface of heat exchange plate 602*e* which bounds a third evaporation chamber 630 and second heat exchange surface 636 comprises the surface of heat exchange plate 602*f* which bounds a fourth evaporation chamber 630. In the fourth of heat exchangers 630, first heat exchange surface 634 comprises the surface of heat exchange plate 602*g* which bounds evaporation chamber 630 and second heat exchange surface 636 comprises the surface of heat exchange plate 602*h* which bounds evaporation chamber 630.

Distribution box 618 is bounded by heat exchange plate 610 on a first end and by heat exchange plate 614 on a second end.

In operation distilland 640 enters the effect module 12 through distilland inlet port 642, a port in box 242. Distilland 640 is then transported by distilland conveyance tube 643 above distribution box 618 and flows out of distilland conveyance tube 643 through distilland distribution ports 644 and into distribution box 618. Distilland 640 under the influence of gravity is then distributed across distribution box 618. A portion of distilland 640 then flows into each of the evaporation chambers 630. Flow of distilland 640 into evaporation chambers 630 is metered by distilland applicators 634. A first edge 645 of a distilland applicator 638 is offset from its associated first heat exchange surface 634 of an evaporation chamber 630; this offset provides a first distribution gap 646 of controlled width which meters the flow of distilland as a distilland film 647 onto first heat exchange surface 634. Likewise, a second edge 648 of a distilland applicator 638 is offset from its associated second heat exchange surface 636 of an evaporation chamber 630; this offset provides a second distribution gap 649 of controlled width which meters the flow of distilland as a distilland film 647 onto second heat exchange surface 636.

As the distilland film 647 flows under the influence of gravity down the first heat exchange surfaces 634 and second heat exchange surfaces 636 of evaporation chambers 630, heat energy will flow through the heat exchanger plates 602 and into distilland film 647. As distilland film 647 absorbs heat energy, portions of it are evaporated and become evaporate 650.

The bottoms of evaporation chambers 630 are open and distilland film 647 and evaporate 650 may flow freely into the lower portions of vapor-tight chamber 10. Distilland film 647 continues its fall into distilland accumulator 652, where it is accumulated as accumulated distilland 654. Evaporate 650 flows freely within vapor-tight chamber 10, where it will ultimately flow into the next effect through the fluid apertures 626 of the adjacent removable baffle 304; this flow will be illustrated more clearly in FIG. 13.

Distilland accumulator 652 comprises the bottom portion of vapor-tight chamber 10. As shown, it is bound on the bottom by bottom plate 232 and on the sides by first side plate 234 and second side plate 236. It is also bound on the sides by compound baffle assembly 214 and adjacent compound baffle assembly 224, as will be illustrated in FIG. 13.

Accumulated distilland 654 is removed from the effect by flowing under the pull of gravity through distilland outlet port 656, a port in the lower portion of box 242, preferably in that portion of box 242 comprising bottom plate 232.

Vapor from the previous effect flows into this effect through fluid apertures 626 of removable baffle 254 and into the condensation chambers 624 of this effect and is thence renamed vapor to be condensed 660. By definition of an operating multiple-effect still, the saturation temperature of renamed vapor to be condensed 660 will be higher than the temperature of distilland film 647, hence vapor to be condensed 660 will condense as condensed vapor 662 on the condensation surfaces 632 of heat exchange plates 602 and in the process transfer its latent heat of vaporization to heat exchanger plates 602, which in turn transfers this heat to the distilland film flowing down their evaporation surfaces facing evaporation chambers 630; as this heat is absorbed by distilland film 647 a portion of it evaporates. The bottom portions of the condensation chambers 624 function as condensate accumulators 664; as condensed vapor 662 flows reaches the bottom of its downward path and flows into distilland accumulators 664, it becomes accumulated condensate 666.

Note, as illustrated heat exchanger plate 610 and heat exchange plate 614 provide boundaries for condensation chambers 624. This is representative not definitive; one skilled in the art will readily understand how to apply the principles disclosed herein to an application wherein either or both of heat exchange plate 610 and heat exchange plate 614 provide a boundary for an evaporation chamber 630.

Figure 12:
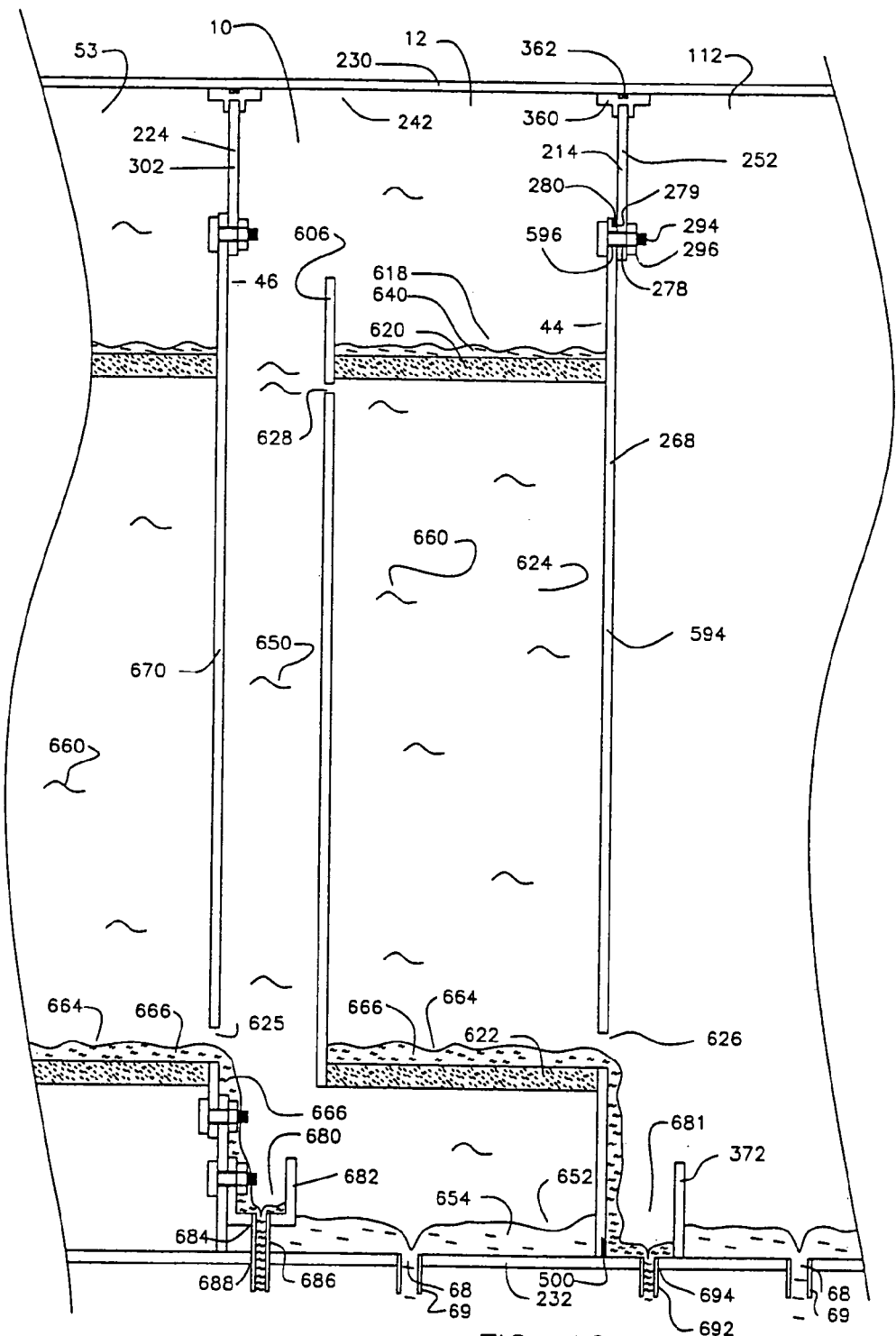
FIG. 12 is a longitudinal cross-sectional view of an effect module in accordance with the present invention, through the center of a condensation chamber.

FIG. 12 is a longitudinal cross section of an effect module 12 through the center of a condensation chamber 624. Whereas FIG. 10 disclosed an alternate embodiment of a heat exchanger mounted on removable baffle 594, it did not show removable baffle 594 as an element of an effect module 12, which is now herein disclosed.

A vapor-tight chamber 10 of effect module 12 is bounded by containment box 242, by compound baffle assembly 214 located at first end 44 of containment box 242, and by adjacent compound baffle assembly 224 located at second end 46 of containment box 242, with containment box 242 comprising a portion of top plate 230 and a portion of bottom plate 232 and beginning at first end 44 and ending at second end 46. Not shown here but shown in FIG. 2 and FIG. 3 are those components of containment box 242 comprising first side plate 234 and second side plate 236. Compound baffle assembly 214 comprises mounting baffle 252 and removable baffle 594. Adjacent compound baffle assembly 224 comprises adjacent mounting baffle 302 and adjacent removable baffle 670.

Bolts 294 are inserted through removable baffle bolting apertures 596 of removable baffle 594, which are aligned and co-located with the mounting baffle bolting apertures 278 of mounting baffle 252, and nuts 296 are installed and tightened in order to sealingly mount removable baffle 594 onto of mounting baffle 252. Baffle gasket 280 presses against mounting baffle sealing surface 279 to effect a seal.

The adjacent compound baffle assembly 224 sealingly joins top plate 230 of containment box 242 by flange 360 and gasket 362 at second end 46. Since the still works under a vacuum, the forces of the external, ambient atmospheric pressure will keep top plate 230 pressed tightly against sealing gasket 362. The bottom portion of adjacent compound baffle 224 provides an example of the first embodiment of the shell as disclosed in FIG. 2, wherein adjacent removable baffle 670 is sealingly fastened to mounting baffle 302 which in turn is rigidly, sealingly joined to bottom plate 232.

Similarly, compound baffle assembly 214 sealingly joins top plate 230 of containment box 242 by flange 360 and gasket 362 at first end 44. The bottom portion of compound baffle 214 provides an example of the second embodiment of the shell as disclosed in FIG. 3, wherein removable baffle 594 extends directly to bottom plate 232 and seals against it with gasket 500.

Fluid aperture 625 is provided in adjacent removable baffle 670 to allow the flow of evaporate 650 into the adjacent, leftward effect 53, where it becomes vapor to be condensed 660 of the adjacent, leftward effect 53. As vapor to be condensed 660 condenses on condensation surfaces 632 (not visible in this cross-section), it flows downward on condensation surfaces 632 under the influence of gravity and is accumulated in condensate accumulator 664 as accumulated condensate 666. Accumulated condensate 666 from the adjacent, leftward effect 53 flows through fluid aperture 625 and into secondary condensate accumulator 680. Secondary condensate accumulator 680 serves to isolate accumulated condensate 666 from accumulated distilland 654 which is collecting in distilland accumulator 652. Two variants of secondary condensate accumulator 680 are illustrated, one skilled in the art could readily produce many more variants. The first of the variants shows condensate accumulator as a box 682 bolted onto adjacent mounting baffle 302. A port 684 is provided at the bottom of box 682 for the removal of accumulated distilland 666 from secondary condensate accumulator 680 by means of condensate removal tube 686 and ultimately from effect module 12 through port 688.

Secondary condensate accumulator 681 is an alternate embodiment secondary condensate accumulator and uses separating wall 374 to separate the bottom portion of vapor-tight chamber 10 into 2 portions, one being secondary condensate accumulator 680 and the other being distilland accumulator 652. Separating wall 374 must be tall enough to provide complete separation of accumulated distilland 654 and accumulated condensate 666. Separating wall 374 is more completely illustrated in FIG. 2. Accumulated condensate 666 is removed from secondary condensate accumulator 681 of vapor-tight chamber 10 through condensate removal tube 692 and port 694, which port 694 is in bottom plate 232 of vapor-tight chamber 10.

Accumulated distilland 654 is removed from effect module 12 through blowdown exhaust port 68 and blowdown tube 69.

That portion of condensation chamber 624 visible in this illustration is bounded by removable baffle 594, containment plate 606, top plug 620, the first end of which seals against removable baffle 594 and the second end of which seals against containment plate 606, and bottom plug 620 the first end of which seals against removable baffle 594 and the second end of which seals against containment plate 606. FIG. 10 provides a more complete illustration of condensation chamber, including the heat exchanger condensing surfaces which are not shown in this illustration.

That portion of condensate accumulator 664 visible in this illustration comprises bottomward the upper surface of bottom plug 622 and leftward a portion of containment plate 606 just above the upper surface of bottom plug 622. To the right condensate accumulator extends to fluid aperture 626, where it is unbounded and from which accumulated condensate 666 may flow freely. It is important that fluid aperture 626 be of sufficient height that when accumulated condensate 666 it at its highest level within a specific condensate accumulator 664 that it still not interfere with the flow of evaporate 650 from a leftward adjacent effect into the condensation chamber 624 in which the specific condensate accumulator 664 is located.

As evaporate 650 from the rightward adjacent effect 112 passes through fluid aperture 626 of removable baffle 594 of effect module 12, it becomes the vapor to be condensed 660 of effect module 12; after condensing it becomes condensed vapor 662, is accumulated in condensate accumulator 664 as accumulated condensate 666 and flows through fluid aperture 626 into the rightward adjacent effect 112, flows into secondary condensate accumulator 681, and then flows through port 694, leaving rightward adjacent effect 112.

Not shown in this illustration but as will be readily apparent upon examination of FIG. 11, accumulated distilland 654 will flow into in distilland accumulator 652.

Blowdown exhaust port 656 and blowdown tube 69 are provided in lower wall 18 to allow the removal from the effect module 12 of blowdown distilland 654 which has flowed to the bottom of chamber 10.

Adjacent mounting baffle aperture 498 must be of sufficient size and proper location so that adjacent mounting baffle 302 does not interfere with the flow of accumulated condensate 666 and evaporate 650 through aperture 625 of adjacent removable baffle 670.

Mounting baffle aperture 268 must also be of sufficient size and proper location so that mounting baffle 252 does not interfere with the flow of accumulated condensate 666 and evaporate 650 through aperture 626 of removable baffle 594.

Non-condensable gas port 628 is provided in containment plate 606 for the passage of non-condensable vapors out of condensation chamber 624 and into the vacuum tight chamber 10, as is common to the art of multiple-effect stills.

Also shown is that portion of distribution box 618 shown from this perspective, as it is formed on one side by the inside surface of removable baffle 594, by the top of plug 620, and by the surface of containment plate 606 which faces removable baffle 594, where a first end of plug 620 seals against the inside surface of removable baffle 594 and the second end of plug 620 seals against the surface of containment plate 606 which faces removable baffle 594. Also shown is distilland 640 being distributed by distribution box 618.

The bottom of condensation chamber fluid aperture 626 is level with the top of bottom plug 622.

Figure 13:
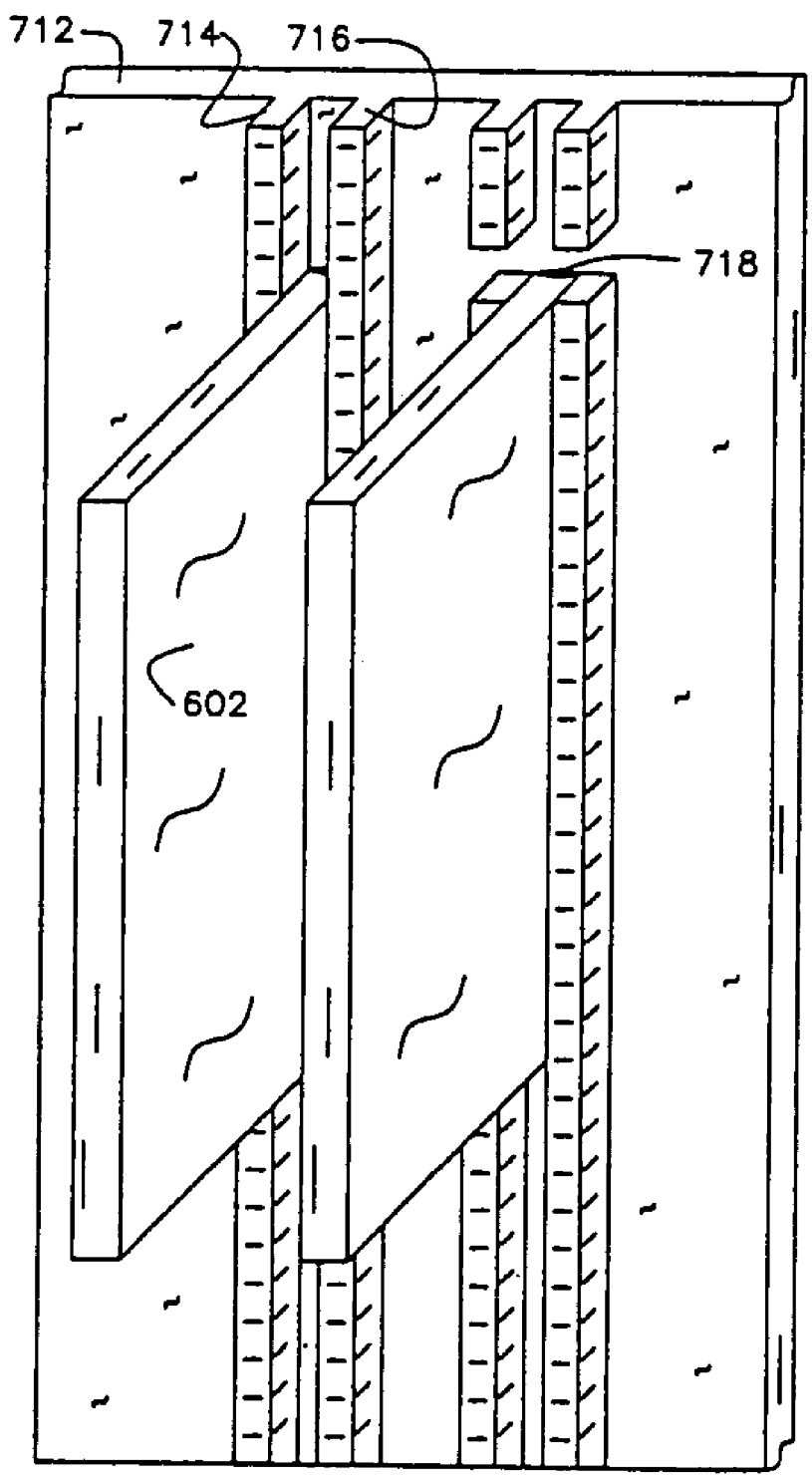
FIG. 13 is a perspective view of an alternate embodiment structure for joining heat exchanger plates to a removable baffle or containment baffle, in accordance with the present invention.

In FIG. 13 there is shown an alternate embodiment structure for joining heat exchanger plates 602 to a removable baffle 594 or containment baffle 606. There are many possible ways effect this joining, all within the scope of this invention. In this FIG. 13 and the next FIG. 14 I will disclose two of many; these are shown as representative not definitive.

Heat exchanger 602 is joined to plate 712, which is representative of either removable baffle 594 or containment baffle 606, by placing it between a first ridge 714 and second ridge 716 and sealingly cementing it with a cement 718. First ridge 714 and second ridge 716 are extruded together with plate 12 as a single, continuous unit. A cutout in one of the replications of first ridge 714 and second ridge 716 allow the cement 718 between heat exchanger 602 and plate 712 better to be seen.

Figure 14:
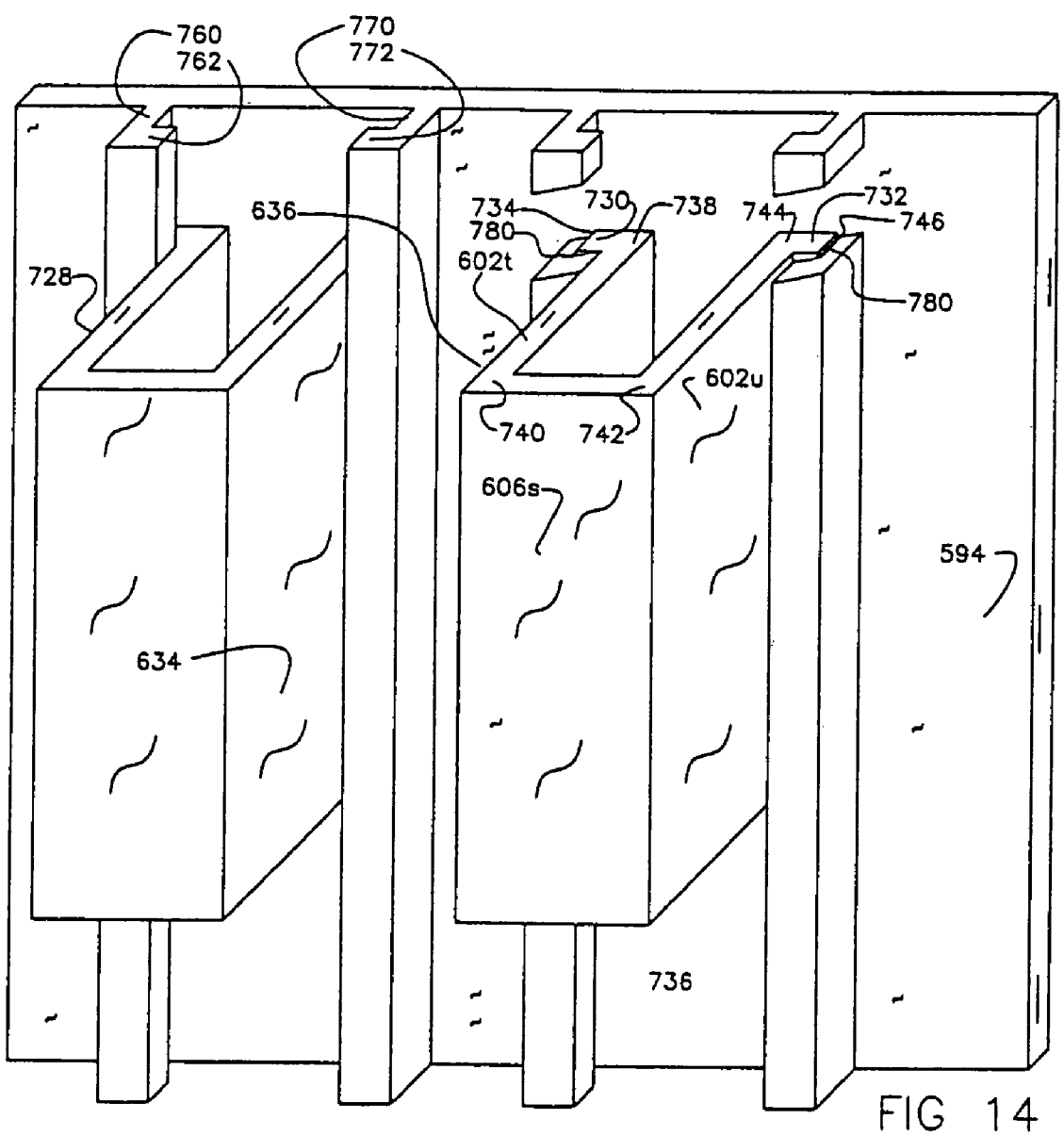
FIG. 14 is a perspective view of another alternate embodiment of an extruded removable baffle, in accordance with the present invention.

In FIG. 14 there is another alternate embodiment of an extruded removable baffle 594. Herein compound heat exchanger 728 comprises a vertically oriented first heat exchange plate 602$t$ with lip 730, a vertically oriented containment plate segment 606$s$, and a second heat exchanger plate 602$u$ with lip 732. Compound heat exchanger 728 may be formed from a single piece of sheet metal fabricated as follows:

Starting at the first end 734 of a sheet 736, a minus 90 degree bend 738 is placed in the sheet 736 to form lip 730. The axis of the bend 738 is parallel to first end 734; bend 738 should be adequately offset from first end 734 to produce a lip 730 of appropriate width. Sheet 736 continues across for the desired width of first heat exchanger plate 602$t$, at which point a plus 90 degree bend 740 is made in the sheet to form the boundary between heat exchanger plate 602$t$ and containment plate segment 606$s$. The axis of bend 740 is parallel to the axis of bend 738. Sheet 736 then continues across for the width of containment plate segment 606$s$ at which point a plus 90 degree bend 742 is made in the sheet to form the boundary between containment plate segment 606$s$ and heat exchanger plate 602$t$. The axis of bend 742 is parallel to the axis of bend 740. Sheet 736 then continues across for the desired width of second heat exchanger plate 602$u$, at which point a minus 90 degree bend 742 is made in the sheet to form the boundary between heat exchanger plate 602$u$ and lip 732. The axis of bend 742 is parallel to the axis of bend 740. Sheet 736 continues to its end 746, which also comprises the end of lip 732 opposite of bend 742. From the perspective view of the figure, a minus 90 degree bend is a clockwise bend and a plus 90 degree bend counter clockwise.

Compound heat exchanger 728 may alternatively be extruded as a single piece to produce a shape equivalent to that just described. In stills wherein heat exchange plates 602$t$ and 602$u$ are of large width but containment plate segment 606$s$ is of small width, the above described shape of compound heat exchanger 728 may be difficult to fabricate. In this case, the embodiment of FIG. 12 can be preferred. In stills whose dimensions of compound heat exchanger 728 are compatible with fabrication processes such as bending or extruding, this FIG. 14 can be preferred.

Lip 730 and lip 732 of compound heat exchanger 728 may be sealingly pressed against removable baffle 594 in order to the form the four vertical walls of a condensation chamber 624. The top wall and bottom wall of a condensation chamber 624 will be disclosed in FIG. 15.

For each compound heat exchanger 728 to be joined to removable baffle 592, there is a vertically-oriented first ridge 760 with lip 762 and vertically-oriented second ridge 770 with lip 772 extruded onto removable baffle 592. Compound heat exchanger 728 is mounted on removable baffle 592 between its associated first ridge 760 and second ridge 770. First ridge 760 is perpendicular to removable baffle 592 and has a width slightly larger than the thickness of lip 730. Second ridge 770 is perpendicular to removable baffle 592 and has a width slightly larger than the thickness of lip 720. Lip 762 is perpendicular to the end of ridge 760 opposite to the end joining removable baffle 594 and is directed towards compound heat exchanger 728. Lip 772 is perpendicular to the end of ridge 770 opposite to the end joining removable baffle 594 and is directed towards compound heat exchanger 728.

Sealing between compound heat exchanger 728 and removable baffle 594 may be accomplished mechanically, by a sealing cement, or both. In the case of mechanical sealing only, lip 762 of ridge 760 should be of the same width as lip 730 of compound heat exchanger 728 and should completely over lap it. Likewise, lip 772 of ridge 770 should be of the same width as lip 732 of compound heat exchanger 728 and should completely over lap it. Very high mechanical pressure is then used to compress sealingly lip 762 against lip 730 by deforming ridge 760 and lip 772 against lip 732 by deforming ridge 770. If a cement is to be used, then the width of lip 762 should be slightly longer than the width of lip 730 and the width of lip 772 should be slightly longer than the width of lip 732 so as to allow cement 780 to fit in the gap 782 formed between the end 734 of lip 730 and ridge 760 and the gap 784 formed between the end 746 of lip 732 and ridge 770.

As illustrated first heat exchange surface 634 comprises the rightward surface of heat exchanger plate 602$u$, it corresponds to the first heat exchange surface 634 of FIG. 10. Likewise, second heat exchange surface 636 comprises the leftward surface of heat exchanger plate 602$t$; it corresponds to the second heat exchange surface 636 of FIG. 10.

In FIG. 15 I show more details of how the embodiment of FIG. 14 is used; all of the components are the same as in FIG. 14 except as follows:

Ridge 760, lip 762, ridge 770, and lip 772 have been machined away in their portions lying above lip 730 and lip 732 of compound heat exchanger in order to allow insertion of distilland applicator 634.

In this embodiment, a multiplicity of distribution boxes 618 are used, one for each distilland applicator 638 that is used. A distribution box 618 comprises the upper portion of first heat exchange surface 634 of the compound heat exchanger 728 which lies leftward of distilland applicator 634, the interior surface of first wall 800 of distilland applicator 638, the upper portion of second heat exchange surface 636 of compound heat exchanger 728 which lies rightward of distilland applicator 638, the interior surface of second wall 802 of distilland applicator 638, and applicator bottom plate 804. Note, as illustrated distilland applicators 638 may easily be removed during maintenance in order to gain access to descale mechanically first heat exchange surfaces 634 and second heat exchange surfaces 636. The leftward edge of first wall 800 extends to first heat exchange surface 634, but it is not necessary to effect a tight seal at the junction. Likewise, the rightward edge of first wall 800 extends to second heat exchange surface 636 but need not effect a tight seal at the junction. In this embodiment, the leftward edge of second wall 802 of distilland applicator 638 will extend to meet the second ridge 770 adjacent to it on the left and the rightward edge of second wall 802 will extend to meet the first ridge 760 adjacent to it on the right.

First distribution gap 646, which lies between first heat exchange surface 634 and first edge 645 of applicator bottom plate 804, allows distilland 640 to flow out of distribution box 618 and onto the lower portions of first heat exchange surface 634 as distilland film 647 (shown in FIG. 11 but not here). Second distribution gap 649, which lies between second heat exchange surface 636 and second edge 648 of applicator bottom plate 804, allows distilland 640 to flow out of distribution box 618 and onto the lower portions of second heat exchange surface 636 as distilland film 647.

Supply distilland 640 is transported by distilland conveyance tube 643 above distribution box 618 and flows out of distilland conveyance tube 643 through distribution ports 644 and into distribution boxes 618.

A portion of first wall 800 and second wall 802 of distilland applicator 638 lies above the tops of the adjacent compound heat exchangers 728 and is used for mounting a distilland applicator 638 between its adjacent compound heat exchangers 728. Thus, lip 810 of first wall 800 extends above and leftward past second heat exchanger plate 602$u$ of the leftward compound heat exchanger 728 and rests upon it. Likewise, lip 812 of second wall 800 extends above and leftward past second heat exchanger plate and rests upon it. Lip 814 of first wall 800 extends above and rightward past first heat exchanger plate 602$t$ of the rightward compound heat exchanger 728 and rests upon it. Likewise, lip 816 of second wall 802 extends above and rightward past first heat exchanger plate 602$t$ and rests upon it.

In FIG. 16 I show a stand alone distilland applicator 638 as described in FIG. 15, shown for clarity. In an embodiment such as disclosed in FIG. 10, the structure is symmetrical, with both first wall 800 and second wall 802 being similar. In an embodiment such as disclosed in FIG. 15, the ridges 760 and 770 will interfere with the extension of second wall 802 towards the heat exchange surfaces 602$t$ and $u$. In this case, second wall 802 will extend leftward until first end 820 would reach ridge 770 and rightward until second end 822 reaches ridge 760.

Distilland applicator 638 may be molded, stamped, machined, or otherwise fabricated in accordance with standard engineering and manufacturing processes.

Composition of components has not been specified because this invention has applicability to the general art of multiple-effect stills, independent of component composition. In the art it is well-known to compose heat exchangers out of aluminum, copper, copper-nickel, stainless steel, titanium, plastic, and other materials. Shells typically may be of aluminum if aluminum heat exchangers are used or epoxy coated or fiber-glass coated steel or stainless steel for any and all composition of heat exchangers. Gaskets may be rubber or silicon rubber based. The novel concepts of this invention are not dependent upon choice of the materials of construction, but rather apply to the art of multiple-effect distillation independent of material selection.

Whereas certain forms of the invention have been shown and described it should be understood that this description should be taken in an illustrative or diagrammatic sense only. There are many variations and modifications which will be apparent to those skilled in the art which will not depart from the scope and spirit of the invention. I, therefore, do not wish to be limited to the precise details of construction or operation set forth, but desire to avail myself of such variations and modifications as come within the scope of the appended claims.

What is claimed is:

1. A multiple-effect still comprising:
a horizontal shell encompassing a plurality of effects, wherein said horizontal shell comprises a main shell body, access means for providing access into main shell body, and a cover over said access means,
means for temporarily sealingly fastening said cover to said main shell body,
a series of vertical compound baffle means sealingly fastened to said horizontal shell for dividing said horizontal shell into a series of pressure-tight chambers, wherein each of said pressure-tight chambers along with its associated apparatus constitute an effect of said still and wherein each of said compound baffle means comprises a fixed baffle component and a removable baffle component,
means for sealing joining said fixed baffle component to said removable baffle component,
a distillation apparatus fastened to said removable baffle component, wherein said distillation apparatus includes an evaporation surface and a condensation surface and a pressure chamber isolated from the pressure-tight chamber in which it is located,
a port in the compound baffle means to allow the passage of evaporate between the isolated pressure chamber and the pressure-tight chamber of an adjacent effect,
means for applying distilland to said evaporation surface,
means for removing accumulated, unevaporated distilland from the shell, and
means for removing condensate from the shell,
wherein said access means is configured to permit passage of the removable baffle and the associated distillation apparatus fastened to it.

2. A multiple-effect still as claimed in claim 1, wherein said horizontal shell of cylindrical shape.

3. A multiple-effect still as claimed in claim 1, wherein said horizontal shell is of rectangular shape.

4. A multiple-effect still as claimed in claim 1, wherein said distillation apparatus comprises heat exchanger tubes.

5. A multiple-effect still as claimed in claim 1, wherein said distillation apparatus comprises heat exchanger plates.

* * * * *